United States Patent [19]
Takeuchi et al.

[11] Patent Number: 5,343,455
[45] Date of Patent: Aug. 30, 1994

[54] DIGITAL SIGNAL OVERLAPPED OR JOINED RECORDING METHOD AND APPARATUS

[75] Inventors: Toshifumi Takeuchi; Takao Arai; Yutaka Nagai; Izumi Kimura, all of Kanagawa, Japan

[73] Assignee: Hitachi, Ltd., Tokyo, Japan

[21] Appl. No.: 677,767

[22] Filed: Mar. 29, 1991

[30] Foreign Application Priority Data

Apr. 5, 1990 [JP] Japan .................. 2-89081
Apr. 5, 1990 [JP] Japan .................. 2-89082

[51] Int. Cl.$^5$ ............................... G11B 7/00
[52] U.S. Cl. ............................ 369/59; 369/4; 360/13; 360/48
[58] Field of Search ............ 360/32, 48, 19.1, 13, 360/14.3, 14.1; 369/59, 47, 48, 49, 4; 358/311

[56] References Cited
U.S. PATENT DOCUMENTS

| | | | |
|---|---|---|---|
| 4,403,261 | 9/1983 | Tanaka | 360/13 |
| 4,541,089 | 4/1985 | Watanabe | 360/13 |
| 4,559,568 | 12/1985 | Watanabe et al. | 360/48 |

Primary Examiner—Aristotelis Psitos
Assistant Examiner—Nabil Hindi
Attorney, Agent, or Firm—Antonelli, Terry, Stout & Kraus

[57] ABSTRACT

A digital signal recording method and apparatus for recording first digital data and second digital data on a writable disc without an interleave discrepancy therebetween. The first digital data is previously recorded and the second digital data is at least one of overlapped and joined with the first digital data on a writable disc so that no interleave discrepancy occurs.

18 Claims, 16 Drawing Sheets

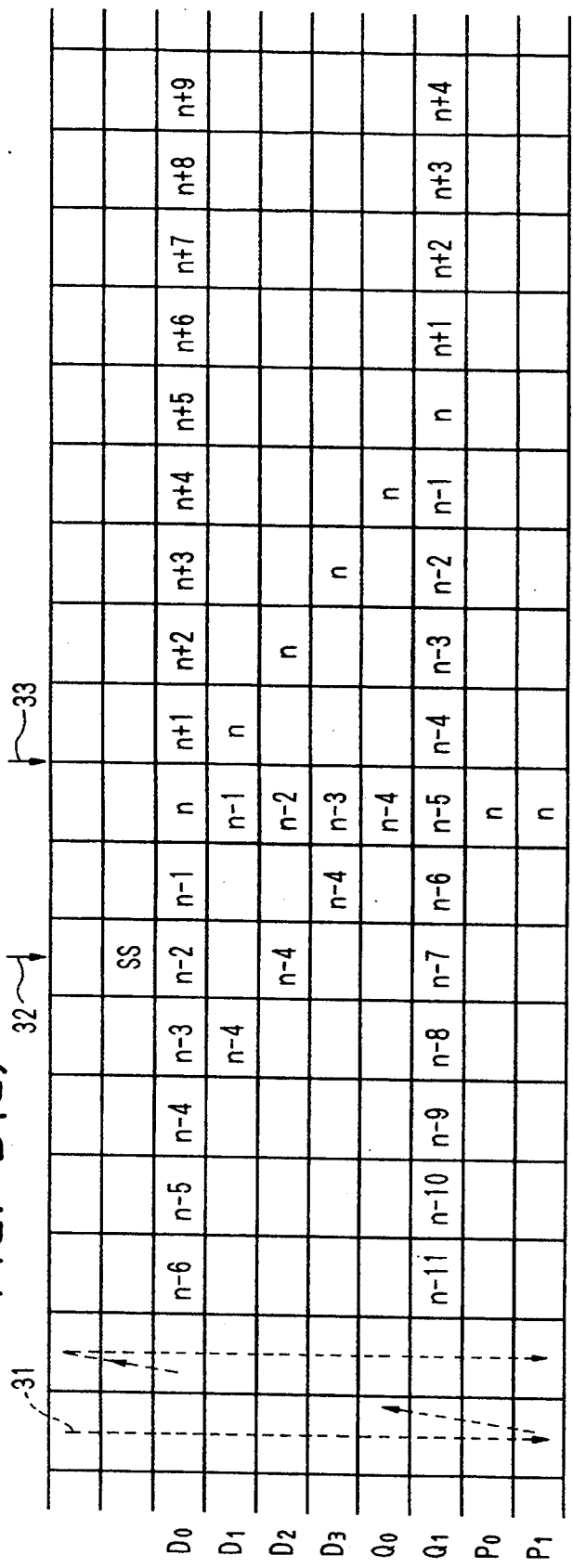
FIG. 5(a)
FIG. 5(b)
FIG. 5(c)
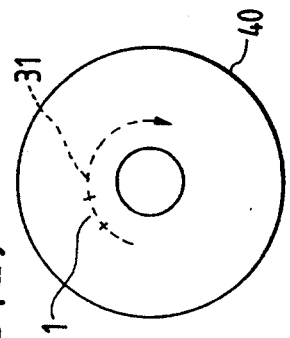
FIG. 5(d)

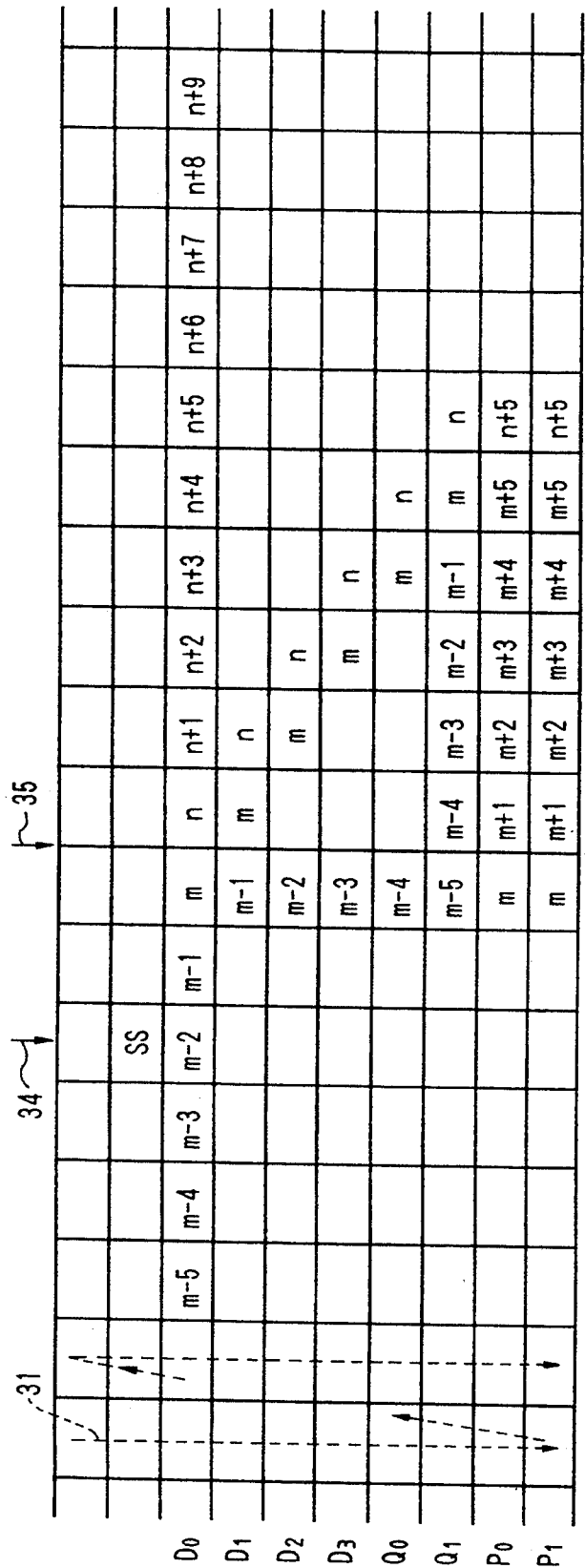

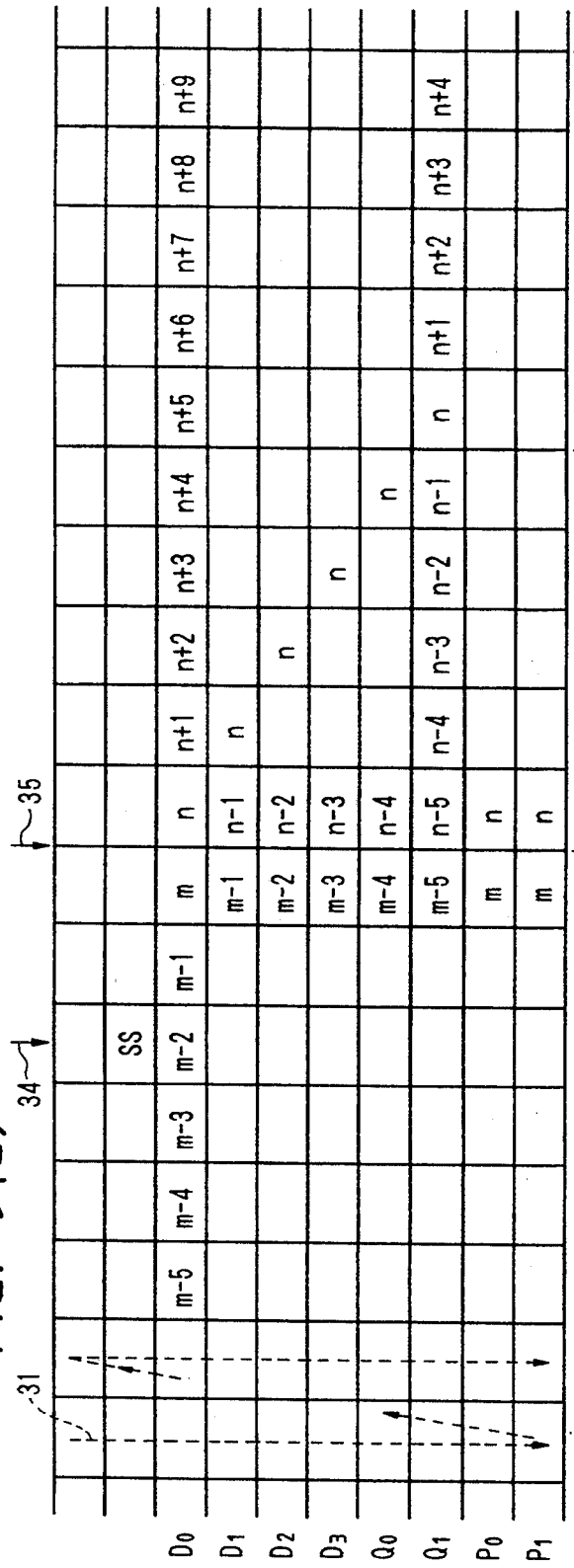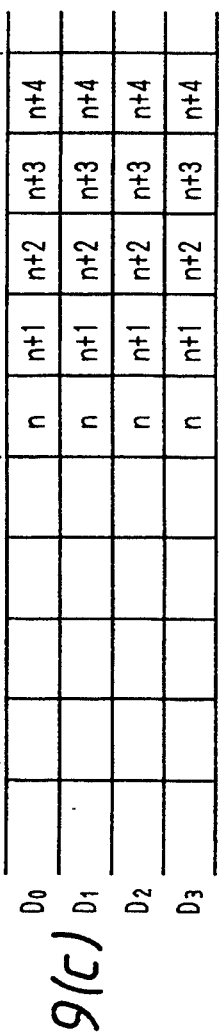
FIG. 9(a)
FIG. 9(b)
FIG. 9(c)
FIG. 9(d)

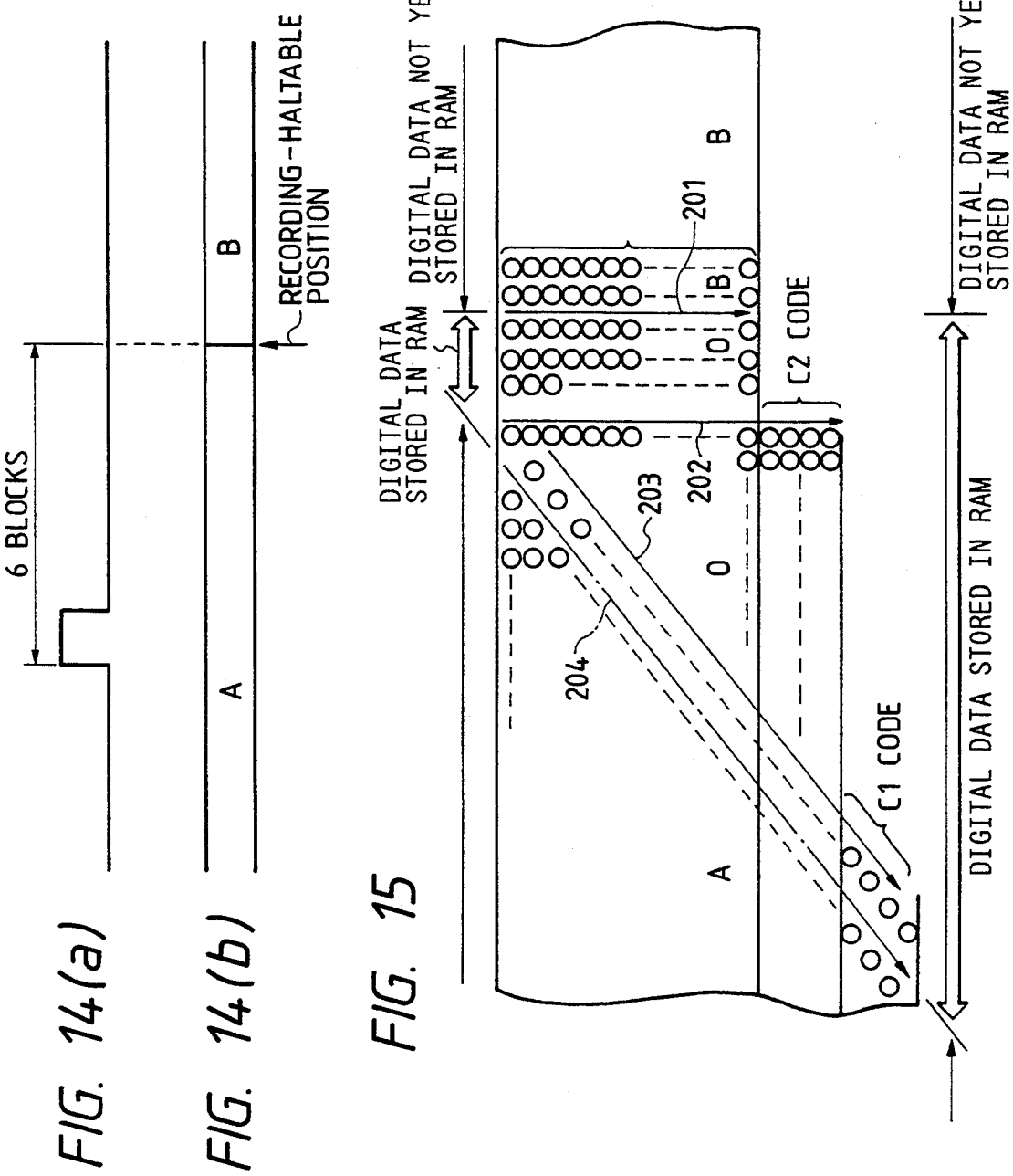

DIGITAL SIGNAL OVERLAPPED OR JOINED RECORDING METHOD AND APPARATUS

BACKGROUND OF THE INVENTION

The present invention relates to a digital signal recording and reproducing apparatus and method including a digital signal overlapped or joined recording method for recording digital data over or joined to portions of other digital data already stored on a writable disc.

In an ordinary compact disc which is referred to hereafter as a CD, a PCM audio signal having a sampling frequency of 44.1 kHz and the number of quantization bits of 16 is recorded in a predetermined recording format as digital data. A CD player for reproducing a digital signal from such a CD is widely used in consumer applications such as audio equipment dedicated for reproduction.

A study of a disc which has a compatible recording format with the aforementioned CD and which allows digital data to be recorded therein has been making progress in recent years. Such a disc is referred to hereafter as a writable disc. The writable disc category so far includes a type that allows digital data to be recorded only once and a type that allows digital data to be rewritten as is described, for example, at pages 48 to 51 of a collection of manuscripts presented at a 1988 JAS conference.

In order to record digital data in CD recording format, a correction code is first added to the digital data, then interleaving based on a simple delay technique is performed on the digital data and, finally, another correction code is added as is described, for example, in Japanese Patent Application Laid-Open No. 57-4629.

When recording digital data into a writable disc in CD format using the simple delay technique, the following problem is encountered. Assuming that digital data is to be recorded over a portion of other digital data already stored on a writable disc allowing data to be rewritten or that a pause has occurred in the writing of the digital data and subsequently additional digital data is written on the disc so as to be joined with the previous and such writable disc is hereafter referred to as a writable disc and such recording is hereafter referred to as overlapped or joined recording, the start and end points of the overlapped or joined recording between two consecutive recording operations are known as edit points. For example, a recording operation is halted temporarily at a point and then followed by another recording operation starting from the point at which the first recording operation was halted. At an edit point which becomes a boundary between existing and overlapping or joined portions of data, an interleave discrepancy results. When playing back a writable disc which underwent overlapped joined recording, an abnormal sound is reproduced at an edit point due to the interleave discrepancy. Such an abnormal sound causes a problem.

A typical countermeasure known so far is described at pages 90 to 93 of D3, a collection of manuscripts presented in a 1986 JAS conference. This countermeasure was devised for preventing the generation of an abnormal sound due to an interleave discrepancy which is caused by a track jump encountered during, for example, a queue review of a CD player. However, the countermeasure was not devised against an abnormal sound due to an interleave discrepancy which is caused by the overlapped or joined recording.

With the proposed countermeasure, during a period between a time of detection of generation of a track jump in the course of reproduction and a time the interleaving is resolved, reproduction data is obtained by interpolation of recorded data immediately before the detection of the track jump as it is and an error flag is set in order to avoid erroneous correction. In this manner, generation of an abnormal sound as a result of the aforementioned conditions can be suppressed. However, the proposed countermeasure described above is, to the bitter end, devised against generation of abnormal sounds due to interleave discrepancies caused by track jumps. Applying the countermeasure, as it is, to abnormal sounds due to interleave discrepancies caused by overlapped or joined recording of digital data into a writable disc will result in the following problems:

With the proposed countermeasure described above, the detection of a track jump in the course of reproduction allows interleave discrepancies to be detected. However, detection of an interleave discrepancy caused by overlapped or joined recording of digital data into a writable disc, that is, an interleave discrepancy occurring on an edit point boundary must be separately provided. Otherwise, such an interleave discrepancy will remain undetected during reproduction.

Even if such an interleave discrepancy at an edit point can be detected, by merely obtaining reproduction data through interpolation of recorded data immediately before the detection of the interleave discrepancy as it is during a period between a time the interleave discrepancy is detected and a time the interleaving is resolved and setting an error flag for prevention of erroneous correction such as proposed by the countermeasure described above, the quality of the reproduced sound in the proximity of the edit point will inevitably deteriorate.

A CD player could be designed to include a facility for solving all the problems described above. With such a CD player, generation of an abnormal sound due to an interleave discrepancy caused by overlapped or joined recording of a writable disc would be reduced. However, generation of an abnormal sound due to an interleave discrepancy caused by overlapped or joined recording of a writable disc would be reduced only if the writable disc was reproduced using a CD player equipped with such a facility. With a CD player having no such facility, such as the type widely available at the present time, the generation of an abnormal sound remains as it used to be. As a result, the problem is basically unsolved.

SUMMARY OF THE INVENTION

It is therefore an object of the present invention to provide a digital signal overlapped or joined recording method for performing overlapped or joined recording of digital data on a writable disc without resulting in an interleave discrepancy so as to overcome the problems of the conventional technique as described above.

It is another object of the present invention to provide a digital signal recording and reproducing apparatus for performing overlapped or joined recording of digital data utilizing the digital signal overlapped or joined recording method.

In order to achieve the above objects, overlapped or joined recording according to a feature of the present invention is carried out as follows:

First of all, before starting overlapped recording, data which is first digital data stored on the writable disc is once reproduced. The interleave processing is then carried out on the reproduced data in order to convert the data into continuous data before storing into a memory unit. The data stored in the memory unit is subsequently read back and new data which is second digital data to be overlapped is joined to the data read back from the memory unit. Finally, interleave processing is performed on the data read back from the memory unit along with the new data joined after it prior to commencing the overlapped recording.

In addition, when terminating the overlapped recording, data having digital values '0' is recorded for a period longer than a maximum delay time used during the re-interleave processing instead of new data. Afterwards, data existing in the disc after the termination point of the overlapped processing is reproduced and the deinterleave processing is carried out on the reproduced data to convert it into continuous data which is then stored in the memory unit. The data stored in the memory unit is subsequently read back and joined to fixed data identical with the fixed data recorded just before the termination of the overlapped recording. Finally, the interleave processing is again performed on the fixed data along with the joined data read back from the memory unit before being rerecorded into the disc after the termination point of the overlapped recording described above.

According to the present invention, there is provided a digital signal recording and reproducing apparatus equipped with a RAM unit for storing digital data, a RAM controller for controlling the RAM unit, a correction unit for adding a first and second correction code to the digital data, a modulation unit for modulating the digital data and a recording unit for recording the digital data on a disc. The digital signal recording and reproducing apparatus can input digital data, read the digital data after writing the digital data into the RAM unit under the control of the RAM controller, add the first correction code to the read digital data using the correction unit, write the digital data containing the first correction code into the RAM unit under control of the RAM controller, read the digital data after applying interleaving based on a simple delay technique to the written data under control of the RAM controller, add the second correction code to the read digital data using the correction unit, read the digital data after writing the digital data containing the second correction code into the RAM unit under control of the RAM controller, modulate the read digital data using the modulation unit and record the digital data into the disc using the recording unit.

The digital signal recording and reproducing apparatus is characterized in that when recording of digital data into the disc is temporarily halted or paused, the digital signal recording and reproducing apparatus keeps checking whether or not said recording unit is on a recording-haltable or pause position of the disc and as the recording unit is detected to be on the recording-haltable position of the disc, the digital signal recording and reproducing apparatus discontinues the control by the RAM controller and the recording by said recording unit, and when the recording of the digital signal is resumed, the digital signal recording and reproducing apparatus keeps checking whether or not the recording unit is on the recording-haltable position of the disc and as the recording unit is detected to be on said recording-haltable position of the disc, the digital signal recording and reproducing apparatus resumes the control by the RAM control unit and the recording by the recording unit.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 5(a) is an illustrative diagram showing a typical layout of data stored on the writable disc before overlapped processing is performed by the embodiment of FIG. 1.

FIG. 5(b) is an illustrative diagram showing typical data reproduced by the embodiment of FIG. 1.

FIG. 5(c) is a timing diagram showing the timing of an operation to retain reproduced data carried out by a reproduced data holding circuit of FIG. 1.

FIG. 5(d) is a planar view of a typical writable disc used in the embodiment shown in FIG. 1.

FIG. 8(a) is an illustrative diagram showing a typical layout of data stored on the writable disc right after the overlapped recording performed by the embodiment of FIG. 1.

FIG. 8(b) is a timing diagram showing the timing of the recording/reproduction control signal of FIG. 1.

FIG. 8(c) is a timing diagram showing the timing of the encoder control signal of FIG. 1.

FIG. 8(d) is an illustrative diagram showing typical data output by the switching circuit of FIG. 1.

FIG. 9(a) is an illustrative diagram showing a typical layout of data stored on the writable disc right after the overlapped recording has been completed by the embodiment of FIG. 1.

FIG. 9(b) is a timing diagram showing the timing of the recording/reproduction control signal of FIG. 1.

FIG. 9(c) is an illustrative diagram showing typical reproduced data.

FIG. 9(d) is a timing diagram showing the timing of an operation for retaining reproduced data performed by the reproduced data holding circuit of FIG. 1.

FIG. 10(a) is an illustrative diagram showing a typical layout of data stored in the writable disc right after the overlapped recording performed by the embodiment of FIG. 1.

FIG. 10(b) is a timing diagram showing the timing of the recording/reproduction control signal of FIG. 1.

FIG. 10(c) is an illustrative diagram showing typical data output by the switching circuit of FIG. 1.

FIG. 10(d) is a timing diagram showing the timing of an input switching operation performed by the switching circuit of FIG. 1.

FIG. 14(a) is a timing diagram showing the timing of a subcode synchronization signal of FIG. 12.

FIG. 14(b) is a timing diagram showing the timing of digital data recording on a writable disc of FIG. 12.

FIG. 15 is an illustrative diagram explaining another recording operation of the digital signal recording and reproducing apparatus shown in FIG. 12.

DETAILED DESCRIPTION OF THE PREFERRED EMBODIMENT

Figure 1:
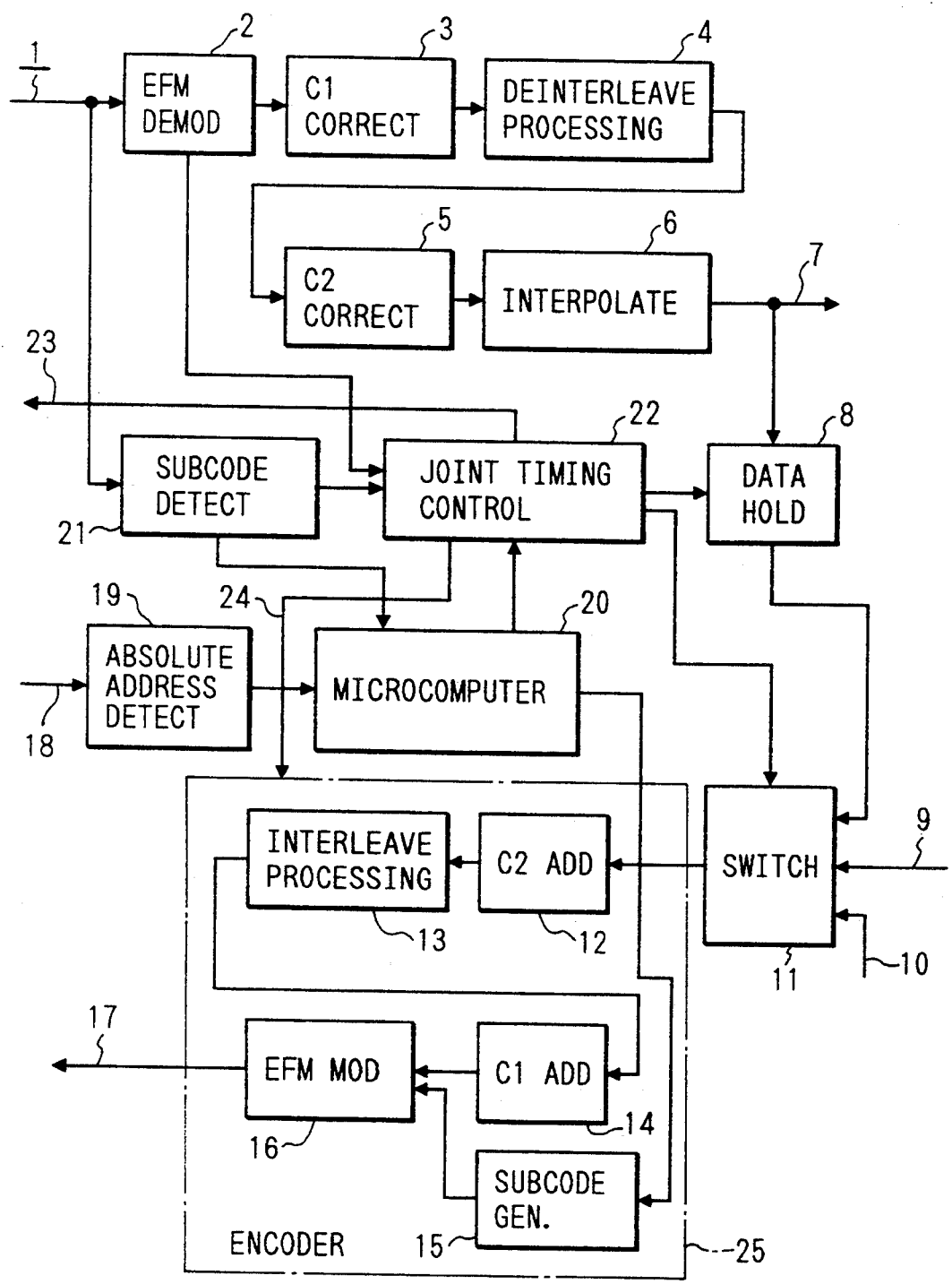
FIG. 1 is a block diagram of signal processing circuits employed in an embodiment of a recording and reproducing apparatus which allows digital data to be recorded into a writable disc using a digital signal overlapped recording technique according to the invention.

Referring now to the drawings, FIG. 1 is a block diagram of signal processing circuits employed in a recording and reproducing apparatus which allows digital data to be recorded into a writable disc using a digital signal overlapped recording method according to the present invention.

In addition to the signal processing circuits shown in FIG. 1, the digital signal recording and reproducing apparatus is also equipped with, for example, a pickup for recording and reproducing digital data into and from the writable disc, a servo mechanism, recording and reproducing amplifiers and a clock control circuit which are not shown. A pregroove is engraved on the surface of the writable disc for use by the tracking servo mechanism of the pickup and for obtaining an absolute address signal.

For reproduction, a reproduced signal coming from a pickup (not shown) is demodulated into eight-bit data by an eight-to-fourteen demodulation circuit 2, referred to hereafter as EFM. A C1 correction circuit 3 carries out error detection and correction processing utilizing a C1 code which was added during recording. After undergoing the error detection and correction processing in the C1 correction circuit 3, the corrected data is supplied to a deinterleave processing circuit 4 where interleaving is resolved before being sent to a C2 correction circuit 5. The C2 correction circuit 5 carries out error detection and correction processing utilizing a C2 code which was added during recording. As for data that cannot be corrected by the error correction processings, a compensation (interpolation) circuit 6 performs interpolation on correct data before and after the uncorrectable data. Data 7 reproduced by the interpolation circuit 6 is supplied to a digital-to-analog converter (not shown) referred to hereafter as a D/A converter. The D/A converter converts the data 7 into an analog signal to produce an audio signal. A subcode detection circuit 21 detects a subcode in each block of the reproduced signal in order to obtain, among other things, timing information. The principle of operation of the reproduction portion of the apparatus as described above is the same as that of a CD player currently in general use.

For recording with the apparatus of FIG. 1, data for recording 9 transmitted by an analog-to-digital converter (not shown) and hereafter referred to as an A/D converter is input to a C2 code addition circuit 12 through a switching circuit 11. The C2 code addition circuit 12, an interleave processing circuit 13, a C1 code addition circuit 14, an EFM modulation circuit 16 and a subcode generation circuit 15 constitute an encoder 25 which is used for carrying out encoding according to a CD recording format. A signal for recording 17 output by the EFM modulation circuit 16 is recorded into a writable disc by a pickup (not shown)- At that time, an absolute address signal 18 is reproduced from the pregroove engraved on the writable disc. The absolute address signal 18 is then demodulated by an absolute address detection circuit 19 into absolute address data which is input to a control microcomputer 20. The absolute address data is used by the control microcomputer 20 for setting, among other things, timing information into the subcode generation circuit 15. The operation of the recording portion of the apparatus as described above allows data to be recorded into a writable disc in CD recording format.

Two channels of PCM data with a sampling frequency of 44.1 kHz and sixteen-bit quantization are recorded in CD recording format. According to the CD recording format, six samples per channel are first formed into a data block comprising a total of twenty four bytes. As described previously, after adding the C2 code comprising four bytes to the block and carrying out the interleave processing, the C1 code also comprising four bytes for error correction is added to form a new block. A block synchronization code and a one-byte subcode are then added to the beginning of the new block to constitute a complete block which is finally recorded into a writable disc. Accordingly, a complete block recorded on a writable disc comprises a block synchronization code and data words comprising thirty three bytes. Another one-byte subcode, the same subcode as described above, is added to every ninety eight complete blocks as a subcode synchronization code for indicating the end of data.

Digital data is recorded into a writable disc in the actual CD recording format as blocks as explained above. However, in order to simplify the following explanation, a simplified recording format is assumed and the simplified format is described below.

Figure 2:
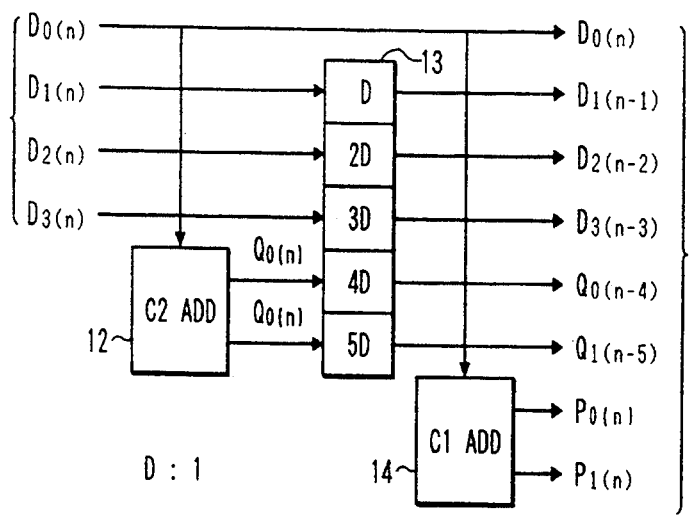
FIG. 2 is a block diagram showing a C2 code addition circuit, an interleave processing circuit, and a C1 code addition circuit corresponding to a simplified recording format used in FIG. 1.
Figure 3:
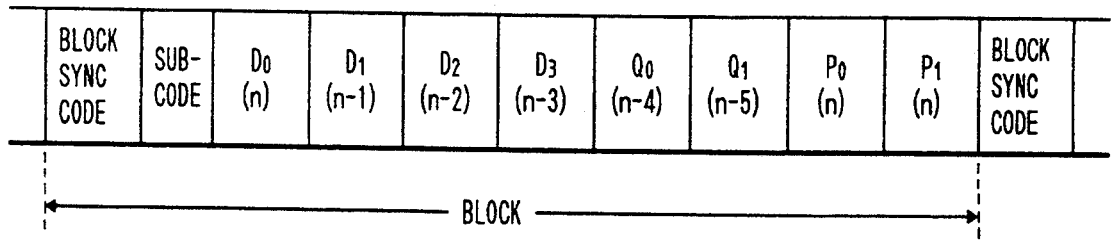
FIG. 3 is a diagram illustrating the simplified recording format of data recorded on a writable disc.
Figure 4:
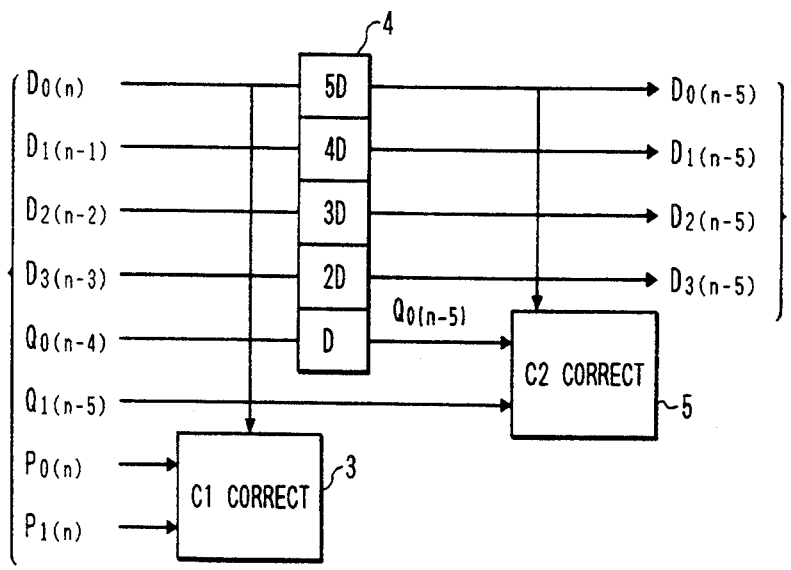
FIG. 4 is a block diagram showing a C1 correction circuit, a deinterleave processing circuit and a C2 correction circuit corresponding to the simplified recording format used in FIG. 1.

FIG. 2 is a block diagram depicting the functions of the C2 addition circuit 12, the interleave processing circuit 13 and the C1 addition circuit 14 which operate for recording according to the simplified recording format used in the apparatus shown in FIG. 1. FIG. 3 is the simplified recording format of data stored on a writable disc. FIG. 4 is a block diagram illustrating the operations of a C1 correction circuit 3, a deinterleave processing circuit 4 and a C2 correction circuit 5 which function for reproduction according to this simplified recording format used in the apparatus shown in FIG. 1.

As shown in FIG. 2, every four bytes of continuous data D2(n−1), D3(n−1), D0(n), D1(n), D2(n) and so on are formed into a block. The interleave processing circuit 13 delays each data byte by 0 to 5 blocks. The notation n enclosed in parentheses as in D0(n) denotes the order number of a block comprising four subsequent bytes prior to the interleave processing. The C2 addition circuit 12 adds two bytes Q0 and Q1 whereas the C1 addition circuit 14 adds two bytes P0 and P1 to each block. Accordingly, a block of data recorded on a writable disc in simplified recording format comprises nine bytes including a subcode, and a block synchronization code added to the nine bytes as shown in FIG. 3.

For reproduction, the deinterleave processing circuit 4 delays each byte by 0 to 5 blocks in a manner opposite to the delaying performed during recording as shown in FIG. 4.

It is hereafter assumed that the simplified recording format explained above is used in describing the overlapped recording referring to FIGS. 1 and 5 and the subsequent figures.

A reproduced data holding circuit 8 shown in FIG. 1 retains reproduced data 7 output by the interpolation circuit 6. The retained data is supplied to a switching circuit 11. A joint timing control circuit 22 generates control timing for edit points of overlapped recording. The joint timing control circuit 22 receives timing information from the subcode detection circuit 21, subcode detection timing and instructions from the control microcomputer 20, such as recording commands, and controls the operation to select one of the inputs to the switching circuit 11, the operation to retain and output reproduced data by the reproduced data holding circuit 8 and the timing of a recording and reproduction control signal 23 transmitted to the pickup (not shown).

FIG. 5(a) is an illustrative diagram showing a typical layout of data stored on a writable disc before overlapped processing is carried out by the embodiment. FIG. 5(b) is an illustrative diagram showing typical reproduced data 7 output by the interpolation circuit 6 shown in FIG. 1. FIG. 5(c) is a timing diagram showing the timing of the operation to hold reproduced data carried out by the reproduced data holding circuit 8, and FIG. 5(d) is a planar view of a typical writable disc 40 used in the embodiment shown in FIG. 1.

In FIG. 5(a), a block is shown as a column. Data bytes are laid out from the top to the bottom of a column and columns are arranged from the left to right side of FIG. 5(a) in the order they are traced by the pickup along a track on the writable disc 40 with the tracing direction of the pickup being shown in FIG. 5(a) as a broken line arrow 31. As is apparent, the recorded data may be considered to be first digital data in the form of a plurality of blocks with each block having a rearrangeable order of N words, N being a positive integer.

A point on the writable disc 40 at which overlapped recording is to be started can be established by using timing information of a subcode and using the position of a subcode synchronization code as a reference. That is, overlapped recording is started at an edit point 33 which is located two blocks after a block 32 containing a detected subcode synchronization code (SS). The block 32 is hereafter called a subcode synchronization block.

Data stored on the writable disc 40 after the edit point 33 is destroyed by the overlapped recording. That is, data bytes (D0) to (D3) of block number n+1 and the subsequent blocks are completely deleted from their interleaved position as is apparent from FIG. 5(a). If overlapped recording is carried out with the existing data left as it is, an interleave discrepancy will result because data bytes (D0) to (D3) and codes (Q0) and (Q1) of block numbers n−4 to n are interleaved on both sides of the edit point 33.

In accordance with the present invention, initially data interleaved on both sides of the edit point 33 is once reproduced and reproduced data is then stored in the reproduced data holding circuit 8. That is, the joint timing control circuit 22 generates the same timing as the timing at which data bytes (D0) to (D3) of block numbers n−4 to n shown in FIG. 5(b) are output by the interpolation circuit 6 shown in FIG. 1 as the reproduced data 7. The timing generated by the joint timing control circuit 22 is shown in FIG. 5(c). The reproduced data holding circuit 8 stores data of block numbers n−4 to n shown in FIG. 5(b) in accordance with the timing shown in FIG. 5(c). After the above processing has been executed, the pickup performs a track jump so as to retrace the edit point on the writable disc 40, entering an overlapped recording step.

Figures 6A, 6B, 6C, 6D:
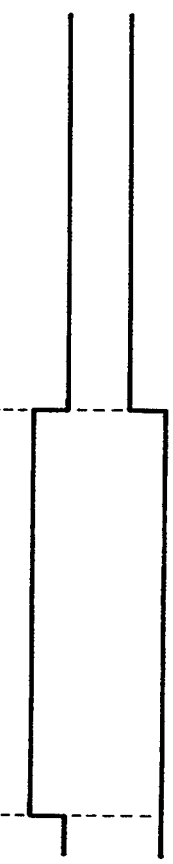
FIG. 6(a) is an illustrative diagram showing a typical layout of data stored on the writable disc right after the overlapped processing has been started by the embodiment of FIG. 1.
FIG. 6(b) is an illustrative diagram showing typical data output by a switching circuit of FIG. 1.
FIG. 6(c) is a timing diagram showing the timing of an input switching operation performed by a switching circuit of FIG. 1.
FIG. 6(d) is a timing diagram showing the timing of a recording/reproduction control signal of FIG. 1.

FIG. 6(a) is an illustrative diagram showing a typical layout of data stored on the writable disc 40 after the overlapped recording has been started by the embodiment of FIG. 1. FIG. 6(b) is an illustrative diagram showing typical data output by the switching circuit 11 and FIG. 6(c) is a timing diagram showing the timing of an input switching operation carried out by the switching circuit 11. FIG. 6(d) is a timing diagram showing the timing of the recording/reproduction control signal 23 of FIG. 1.

Based on information obtained from the subcode detection circuit 21 and the EFM demodulation circuit 2, the joint timing control circuit 22 exercises switching control on the switching circuit 11 as shown in FIG. 6(c) wherein the switching circuit 11 is controlled so as to select data output by the reproduced data holding circuit 8 starting at a point five blocks before the edit point 33. Accordingly, data bytes (D0) to (D3) of block numbers n-4 to n read from the reproduced data holding circuit 8 which represents first digital data are input to the encoder 25 of the recording portion through the switching circuit 11. Then, starting at the edit point 33, the switching circuit 11 is controlled so as to select recording data 9. Therefore, blocks m, m+1, ... of new continuous data representing second digital data to be recorded are input thereafter to the encoder 25 of the recording portion through the switching circuit 11. The second digital data, as is apparent, is int eh form of a plurality of blocks with each block having a rearrangeable order of N words, N being a positive integer.

The operation to read data from the reproduced data holding circuit 8 and the switching operation performed by the switching circuit 11 allow data bytes (D0) to (D3) and codes Q0 and Q1 of block numbers n−4 to n to be written again as recording data after the edit point 33.

Moreover, at that time, the joint timing control circuit 22 puts the pickup in a recording state by the recording/reproduction control signal 23 as shown in FIG. 6(d). As shown in FIG. 6(a), data can thus be laid out on the writable disc 40 in such a way that no interleave discrepancy at the edit point 33 results. After the overlapped recording execution step has been started as described above, a normal recording operation follows.

Figures 7A, 7B, 7C, 7D, 7E:
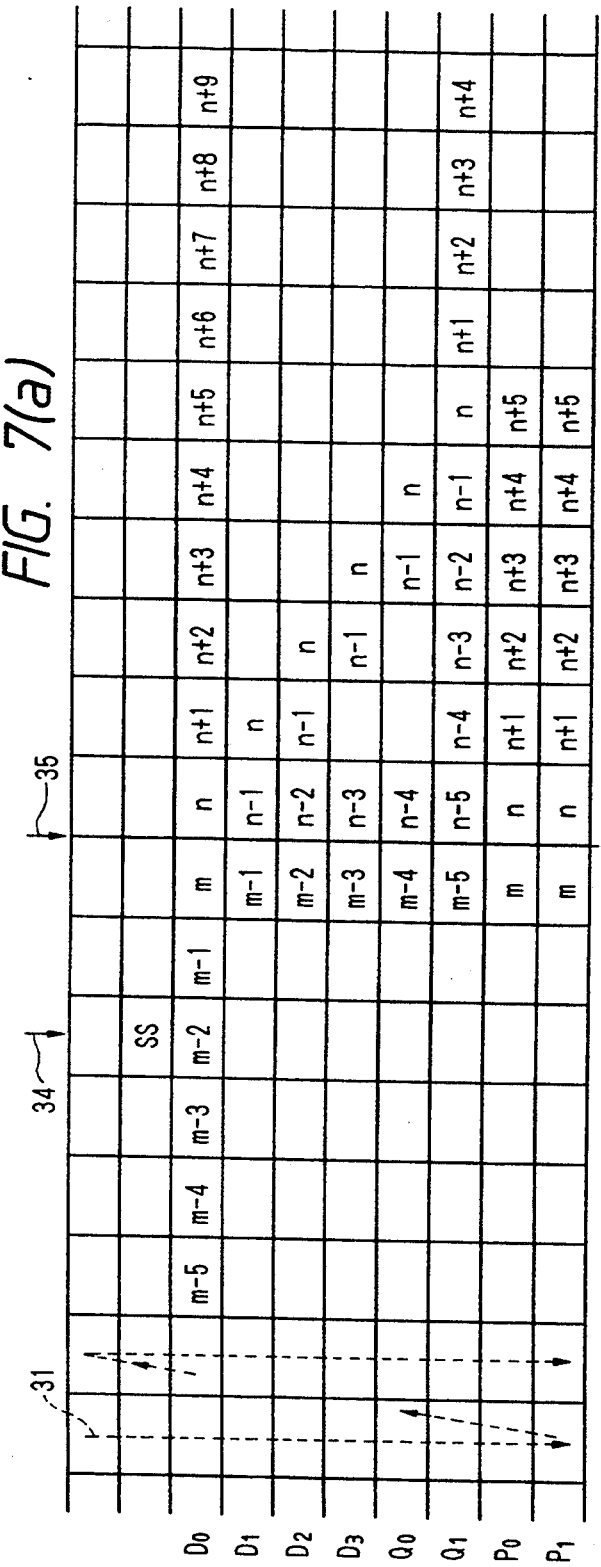
FIG. 7(a) is an illustrative diagram showing a typical layout of data stored on the writable disc immediately after the overlapped recording has been completed by the embodiment of FIG. 1.
FIG. 7(b) is a timing diagram showing the timing of the recording/reproduction control signal of FIG. 1.
FIG. 7(c) is a timing diagram showing the timing of an encoder control signal of FIG. 1.
FIG. 7(d) is an illustrative diagram showing typical reproduced data.
FIG. 7(e) is a timing diagram showing the timing of an operation for retaining reproduced data performed by the reproduced data holding circuit of FIG. 1.

An operation to end the aforedescribed overlapped recording is now described. FIG. 7(a) is an illustrative diagram showing a typical layout of data stored on the writable disc 40 immediately after the overlapped recording has been completed by the embodiment of FIG. 1. FIG. 7(b) is a timing diagram showing the timing of the recording/reproduction signal 23 of FIG. 1, FIG. 7(c) is a timing diagram showing the timing of an encoder control signal 24 of FIG. 1, FIG. 7(d) is a timing diagram showing typical reproduced data, and FIG. 7(e) is a timing diagram showing the timing of an operation for retaining reproduced data carried out by the reproduced data holding circuit 8 of FIG. 1.

A point on the writable disc 40 at which the overlapped recording is to be ended can be established by using timing information of a subcode and using the position of a subcode synchronization code (SS) as a reference. In this embodiment, two blocks behind a point at which a subcode synchronization block 34 containing a subcode synchronization code (SS) is detected is taken as an edit point 35 to end the overlapped recording. At the edit point 35, the joint timing control circuit 22 switches the pickup from the recording state to a reproducing state by the recording/reproduction control signal 23 as shown in FIG. 7(b). As shown i FIG. 7(a), this state transition of the pickup leaves data recorded on the writable disc 40 after the edit pint 35 unaltered by the overlapped recording. Accordingly, previous data bytes indicated by clock number n, n−1, ... remain as they are. With the data on both sides of the edit point 35 remaining as they are, there will be an interleave discrepancy between data pertaining to block number m−4 to m and data of block numbers n−5 to n−1 so that an abnormal sound will be generated during reproduction.

In order to eliminate such an interleave discrepancy, in accordance with the present invention, the encoder 25 is halted at the edit point 35 by the encoder control signal 24 as shown in FIG. 7(c). The termination of operation of the encoder 25 causes data of blocks m−4 to m that has not been recorded into the writable disc 40 to be held in the encoder 25. Subsequently, the reproduced data holding circuit 8 performs an operation for retaining reproduced data 7. The reproduced data 7 retained at this time is the first five blocks of data recorded after the edit point 35 that does not generate an interleave discrepancy as shown in FIG. 7(a). That is, the reproduced data 7 retained by the reproduced data holding circuit 8 is the data pertaining to blocks n to n+4 as shown in FIG. 7(d). It should be noted that the number of retained blocks which is five is equal to the interleave length.

The timing for retaining the reproduced data 7 can be determined by the timing of the edit point 35 and the length of time required by the circuits of the reproduction portion to execute the process for retaining the data. In practice, the timing for retaining the reproduced data 7 is generated by the joint timing control circuit 22 as shown in FIG. 7(e). It is apparent from FIG. 7(e) that the timing for retaining the reproduced data 7 is the same as the timing to output the data of blocks n to n+4. Following the processing step at the ending edit point 35 described above, the pickup carries out a track jump, retracing the edit point 35 in order to execute a processing step for eliminating the interleave discrepancy.

FIG. 8(a) is an illustrative diagram showing a typical layout of data recorded on the writable disc 40 after the overlapped recording has been performed by the embodiment of FIG. 1. FIG. 8(b) is a timing diagram showing the timing of the recording/reproduction signal 23 of FIG. 1, FIG. 8(c) is a timing diagram showing the timing of the encoder control signal 24 of FIG. 1., and FIG. 8(d) is an illustrative diagram showing typical data output by the switching circuit 11.

At the time the pickup retraces the edit point 35, the joint timing control circuit 22 puts the pickup in a recording state by the recording/reproduction signal 23 as shown in FIG. 8(b). At the same time, the joint timing control circuit 22 switches the encoder 25 from the halt state into an operating state by means of the encoder control signal 24 as shown in FIG. 8(c). Also at the same time, the joint timing control circuit 22 controls the switching circuit 11 so as to select data output by the reproduced data holding circuit 8.

The above operations cause data to be recorded into the writable disc 40 in the following manner: bytes D0(n), D1(m) , D2(m−1) , D3(m−2) , Q0(m−3) and Q1(m−4) , followed by the C1 codes P0(m+1) and P1(m+1) for the bytes, are written immediately after the edit point 35 one after another as shown in FIG. 8(a). The overlapped recording is then ended after five data blocks corresponding to the interleave length are written into the disc 40.

The above operation allows data bytes D0 to D3 and the Q0 and Q1 codes of blocks m−4 to m to be recorded as continuous data and allows block m to be linked to block n without resulting in an interleave discrepancy. That is, since the linking operation at the edit point 35 is carried out in block units of uninterleaved continuous data, data and code bytes are located on the writable disc 40 in such a way that no interleave discrepancy results.

Next, processing in accordance with the present invention for recording fixed patterns at the end of overlapped recording is described. FIG. 9(a) is an illustrative diagram showing a typical layout of data stored on the writable disc 40 after the overlapped recording has been completed. FIG. 9(b) is a timing diagram showing the timing of the recording/reproduction signal 23 of FIG. 1, FIG. 9(c) is an illustrative diagram showing typical reproduced data 7 of FIG. 1, and FIG. 9(d) is a timing diagram showing the timing at which reproduced data is retained by the holding circuit 8 of FIG. 1.

First of all, in order to record fixed patterns, the joint timing control circuit 22 controls the switching circuit 11 so as to select fixed data 10 prior to the end of the overlapped recording. As a result, the fixed data is all recorded, replacing the data of blocks m−5 to m. Subsequent operations following the completion of the recording at the edit point 35 are the same as the operations shown in FIG. 7 except that the joint timing control circuit 22 allows the encoder 25 to continue the operation instead of halting the operation by the encoder control signal 24. Afterwards, the pickup carries out a track jump, executing an operation to retrace the edit point 35 after the reproduced data holding circuit 8 has retained the reproduced data 7 of blocks n to n+4.

Figures 10A, 10B, 10C, 10D:
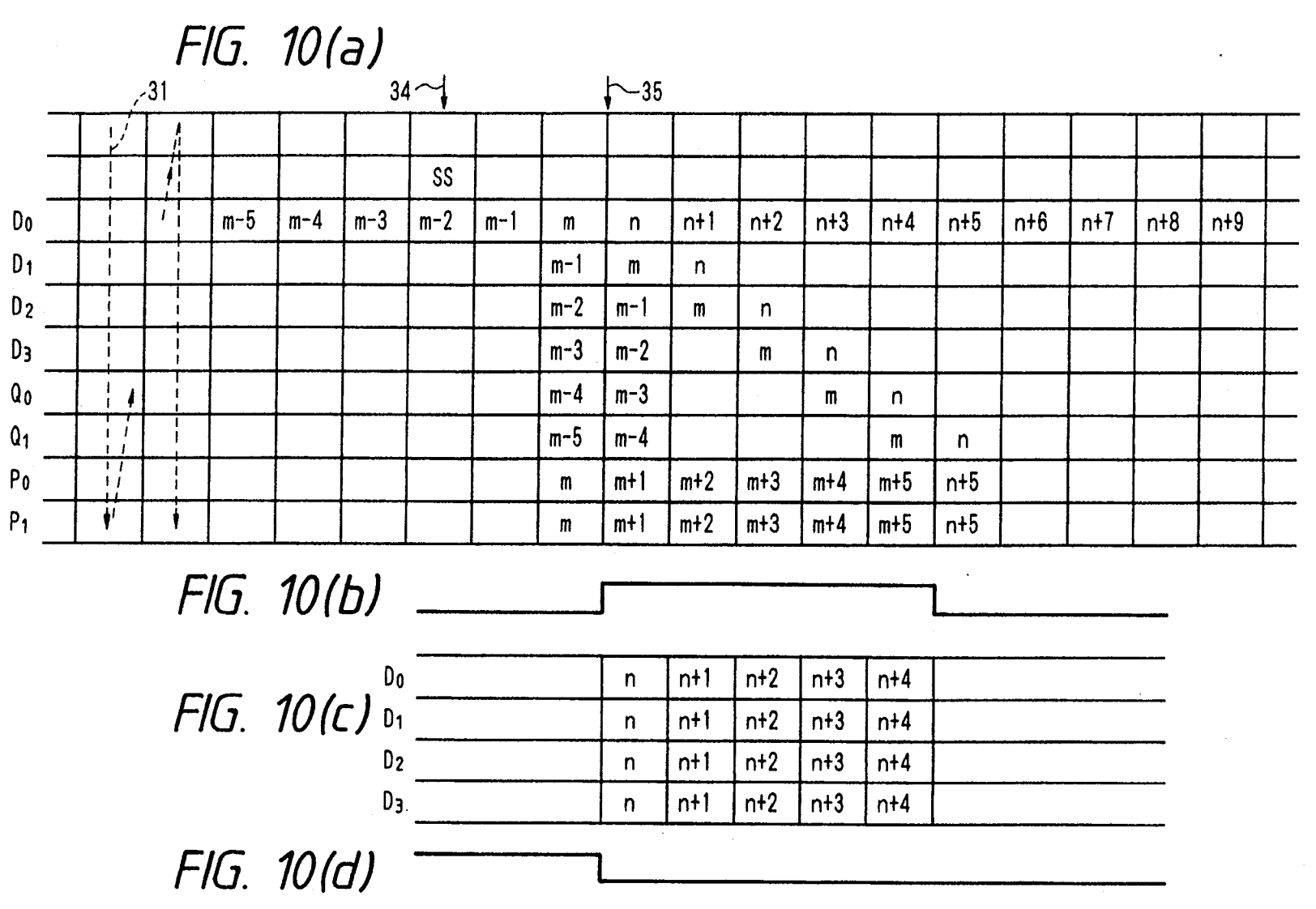

FIG. 10(a) is an illustrative diagram showing a typical layout of data stored on the writable disc 40 after the overlapped recording has been completed. FIG. 10(b) is a timing diagram showing the timing of the recording-/reproduction signal 23 of FIG. 1, FIG. 10(c) is an illustrative diagram showing typical data output by the switching circuit 11 of FIG. 1, and FIG. 10(d) is a timing diagram showing the timing at which the switching circuit 11 of FIG. 1 switches from one input to another.

At the time the pickup retraces the edit point 35, the joint timing control circuit 22 puts the pickup in a recording state of the recording/reproduction signal 23 as shown in FIG. 10(b). At the same time, the joint timing control circuit 22 controls the switching circuit 11 so as to record the fixed data 10 in place of data of blocks m−4 to m. Subsequently, the joint timing control circuit 22 controls the switching circuit 11 so as to rewrite the data of blocks n to n+4 read from the reproduced data holding circuit 8. It should be noted that the data of blocks n to n+4 is the same data previously recorded on the writable disc 40. The above operations which are performed to end the recording by writing fixed data does not halt the encoder 25 at the edit point 35, yet such results in no interleave discrepancy.

The principle of the overlapped recording utilized in accordance with the embodiment of FIG. 1 is based on the assumption that a simplified recording format is used. It is apparent, however, that the same principle of the overlapped recording can be implemented without resulting in interleave discrepancies even if the CD recording format is adopted.

Although FIG. 1 shows a circuit configuration comprising functional units which are physically separated from each other, in an actual design implementation, the C1 and C2 correction circuits can be built as a common unit which is multiplexed timewise between both the functions. In addition, a common memory unit can be shared among the C1 and C2 addition circuits and the deinterleave processing circuit for storing their data. The sharing of the common memory unit can be effected by allocating different addresses to the C1 and C2 addition circuits and the deinterleave processing circuit. Therefore, even though the circuit configuration may differ from design implementation to design implementation, it is apparent that the present invention operates in the manner described.

According to the present invention as described above, when starting and ending overlapped recording on a writable disc, after performing deinterleave processing on digital data stored in the proximity of an edit point, digital data to be overlapped is linked to the deinterleaved digital data and interleave processing is then reexecuted on the deinterleaved data along with the digital data linked to it before recording the data into the writable disc. Accordingly, since the data is linked after the data has been restored to the original order on the time axis prior to the first interleave processing, overlapped recording of the digital data can be carried out without resulting in an interleave discrepancy. As a result, when digital data recorded using the overlapped recording technique described above is reproduced, no abnormal sounds are heard nor does the quality of the sound deteriorate at edit points.

As is described above, before starting overlapped recording, data stored on the writable disc is once reproduced deinterleave processing is then carried out on the reproduced data in order to convert the data into continuous one before storing it into a memory unit. The data stored in the memory unit is subsequently read back and new data to be overlapped is joined to the data read back from the memory unit. The joining of data is thus done after the existing data has been restored to the same order as the original state of the data on the time axis before the interleave processing was carried out on the data. In addition, the interleave processing is performed on the data read back from the memory unit along with the new data joined after it before the overlapped recording is commenced. Accordingly, when reproducing the data from the writable disc, the data can be processed as blocks of continuous data. Therefore, no interleave discrepancy results.

In addition, data exiting in the disc after a termination point of the overlapped processing is reproduced and the deinterleave processing is carried out on the reproduced data to convert it into continuous data which is then stored in the memory unit temporarily. The data stored in the memory unit is subsequently read back and joined to fixed data identical with the fixed data recorded just before the termination of the overlapped recording. Finally, the interleave processing is again performed on the fixed data along with the joined data read back from the memory unit before being rerecorded into the disc after the termination point of the overlapped recording described above. Also in this case, since the joining of data is done after the existing data has been restored to the same order as the original state of the data on the time axis before the interleave processing was carried out on the data, no interleave discrepancy is results.

Figure 11:
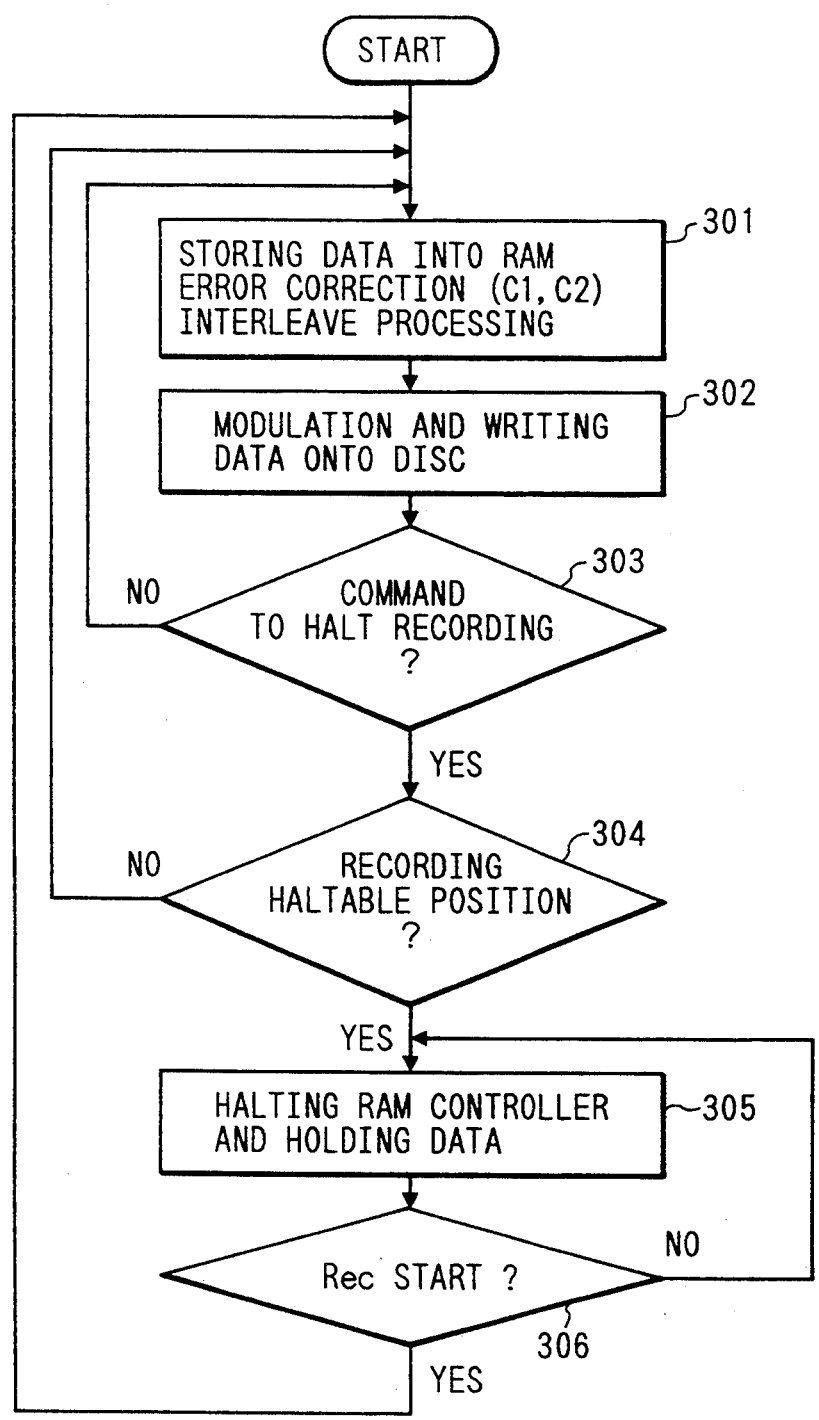
FIG. 11 is a flow chart showing the flow of the recording operation of a digital signal recording and reproducing apparatus of another embodiment according to the present invention.
Figure 12:
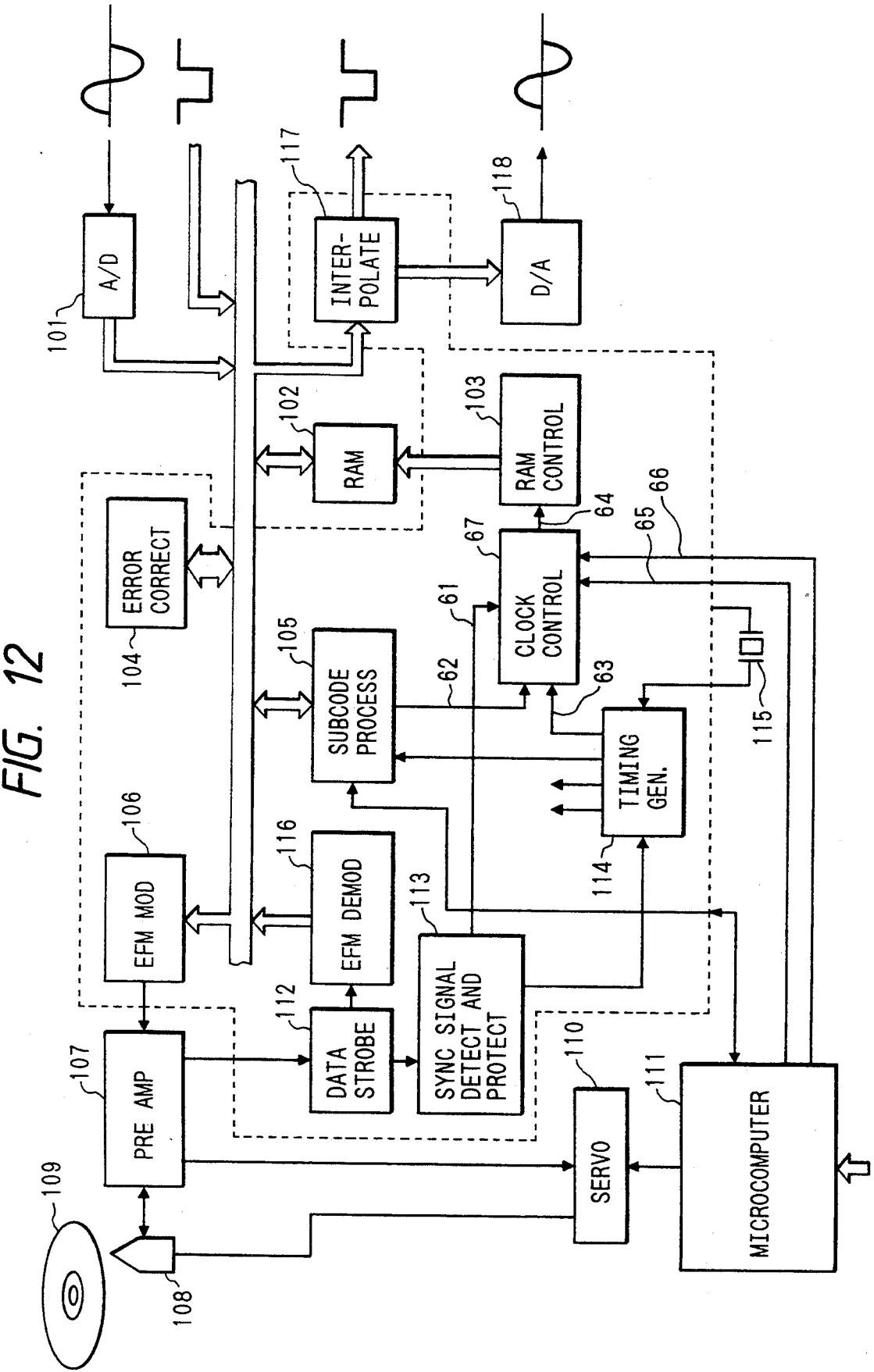
FIG. 12 is a block diagram of the digital signal recording and reproducing apparatus according to the present invention in accordance with the flow chart of FIG. 11.
Figure 13:
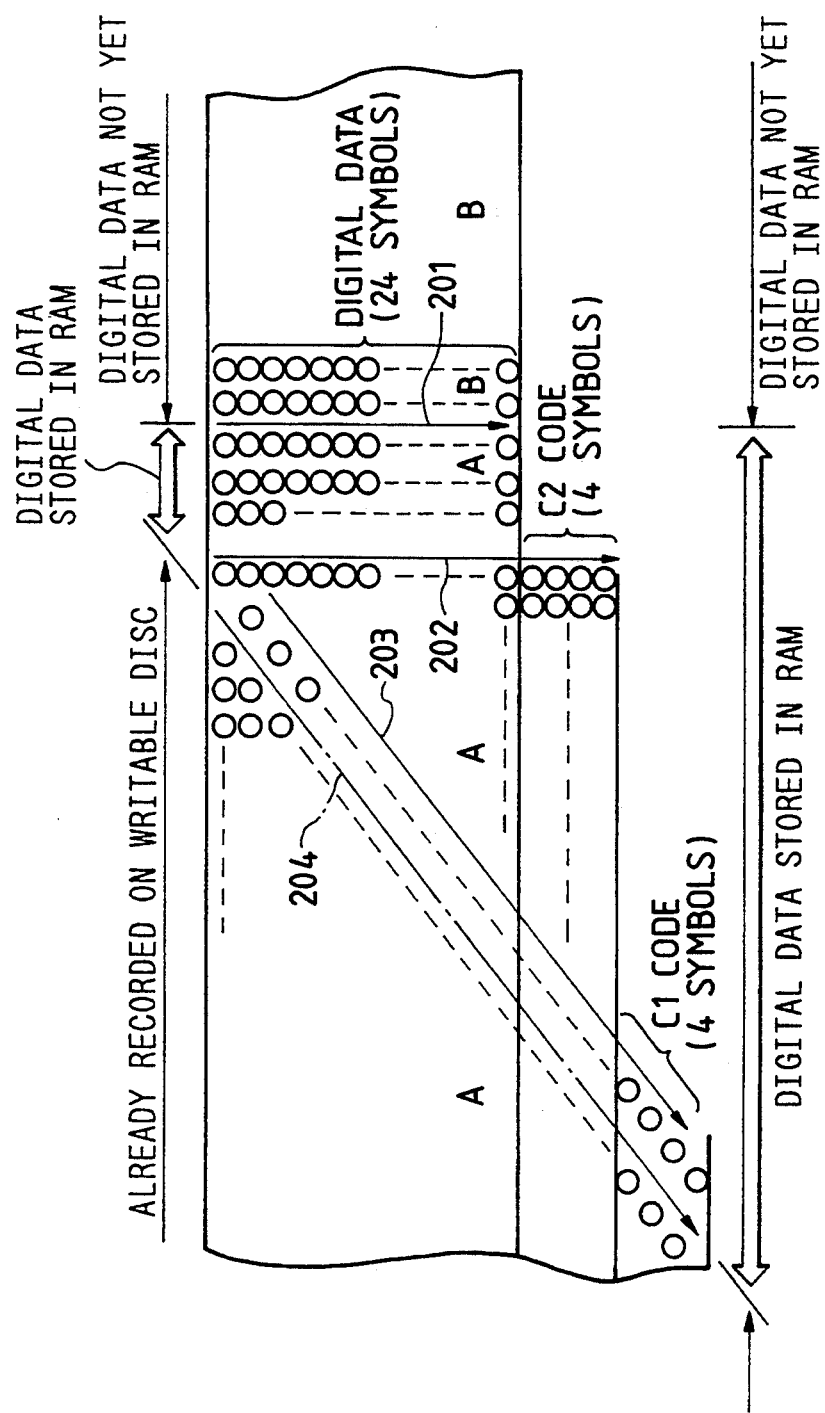
FIG. 13 is an illustrative diagram explaining a recording operation of the digital signal recording and reproducing apparatus shown in FIG. 12.

FIG. 11 is a flow chart showing the flow of recording operations carried out by another embodiment of a digital signal recording and reproducing apparatus according to the invention which is illustrated in block form in FIG. 12. FIG. 13 is a descriptive diagram explaining the recording operation of the digital signal recording and reproducing apparatus shown in FIG. 2.

As shown in FIG. 13, pieces of digital data are each represented by a symbol and laid out on a RAM map for the sake of convenience. The symbolic representation and the layout of the digital data allow a series of processings performed during a period of time as described in the following. During the period of time, digital data is stored in a RAM unit 102, read back and recorded into a writable disc 109. Each circle shown in FIG. 3 is the symbol that represents a piece of digital data. Columns of symbols on the right side are stored in higher addresses than those on the left side. Reference letter (A) denotes data recorded prior to suspension of recording which is carried out as part of a joined recording whereas reference letter (B) denotes data recorded after the recording is resumed. Arrows denoted by reference numerals 201 to 204 each indicate a special processing to be described later. With the passage of time, data undergoes the processings 201 to 204 one after another which are denoted by arrows arranged from the right to the left side in the figure.

Recording operations of the embodiment are described as follows.

First of all, input digital data is written into a RAM unit 102 under control of the RAM control circuit 103 which generates addresses, etc., as shown in FIG. 12. If an analog signal is the original input data, it is converted into digital data by means of an A/D converter 101 before being stored into the RAM unit 102. In this case, the digital data is stored in CD format into the RAM unit 102 as a block comprising a total of twenty four symbols as shown by the arrow 201 in FIG. 13. The twenty four symbols which are shown as a column in FIG. 13 are obtained by reading six words from a channel on the left side and six words from a channel on the right side. The RAM control circuit 103 controls the operation of the RAM unit 102 by supplying addresses to the RAM unit 102. The generation of the addresses is driven by a RAM address generation clock signal 64 input from a clock control circuit 67.

Next, the digital data stored in the RAM unit 102 is read under the control of the RAM control circuit 103 and furnished to an error correction circuit 104. The error correction circuit 104 adds a C2 code comprising four symbols to the read data as shown by the arrow 202 in FIG. 13. The data including the C2 code is written back into the RAM 102 as a new block under the control of the RAM control circuit 103.

Next, interleave processing using a simple delay technique is performed on the new block of the digital data comprising twenty eight symbols laid out in the RAM unit 102 under the control of the RAM control circuit 103 as shown by the arrow 203 in FIG. 13. After undergoing the interleave processing, the block of the digital data is read back and then provided to the error correction circuit 104. The error correction circuit 104 adds a C1 code comprising four symbols to the block which is subsequently stored again into the RAM unit 102 as a new block under the control of the RAM control circuit 103.

Afterwards, the new block of the digital data stored in the RAM unit 102 which now comprises thirty two symbols as indicated by a slanting column in FIG. 13 is read under the control of the RAM control circuit 103. This read operation is denoted by the arrow 204 in FIG. 13.

The processing described up to now is shown as step 301 in FIG. 11 . The digital data read back from the RAM unit 102 in the operation denoted by the arrow 204 is the modulated and amplified by means of an EFM modulation circuit 106 and a preamplifier 107, respectively. Subsequently, the data is recorded into the writable disc 109 by means of a laser diode 108. In carrying out the recording, a servomechanism 110 controls the rotation of the disc 109 and the operation of the laser diode 108 in accordance with the output of the preamplifier 107. The recording process described above is shown as step 302 in FIG. 11.

If an external command to halt of effect a pause of the recording is entered to a system control microcomputer 11, the system control microcomputer 111 outputs a recording halt or pause signal 65 to the clock control circuit 67. The above processing is shown as step 303 in FIG. 11.

As the clock control circuit 67 receives the recording halt signal 65 from the system control microcomputer 111, the clock control circuit 67 makes an attempt to detect a recording-haltable or pause position on the writable disc 109 prescribed by the CD recording format by using a subcode synchronization signal 62 obtained from a subcode processing circuit 105. As the recording-haltable position is detected, the clock control circuit 67 stops the generation of the RAM address generation clock signal 64 output to the RAM control circuit 103.

FIG. 14(a) is a timing diagram depicting the timing of the subcode synchronization signal 62 shown in FIG. 12 whereas FIG. 14(b) is a timing diagram illustrating the timing of the digital data stored in the writable disc 109 shown in FIG. 12. These timing diagrams indicate that after receiving the recording halt signal 65, the clock control circuit 67 receives a pulse of the subcode synchronization signal 62. As shown in the figure, a location on the time axis typically six blocks after the arrival of the pulse of the subcode synchronization signal 62 is regarded as the recording-haltable position on the writable disc 109. The process of detecting the recording-haltable position described above is shown as step 304 in FIG. 11. In this manner, the generation of the RAM address generation clock signal 64 by the clock control circuit 67 is stopped. As a result, since the RAM control circuit 103 discontinues the control of the RAM unit 102, operations to write and read digital data into and from the RAM unit 102 are halted. Accordingly, digital data stored in the RAM unit 102, which-is-not recorded yet into the writable disc 109 is retained in the unit 102 as it is and, at the same time, the addition of the C1 and C2 codes by the error correction circuit 104, the interleave processing on the RAM unit 102, and the recording of data into the writable disc 109 by the laser diode 108 are also halted. In this manner, the recording of digital data into the writable disc 109 can be halted or paused temporarily and the above processing is shown in FIG. 1 aa step 305.

Next, when an external command to resume the recording is entered to the system control microcomputer 111, the system control microcomputer 111 outputs a recording resume signal 66 to the clock control circuit 67. As the clock control circuit 67 receives the recording resume signal 66 from the system control microcomputer 111, the clock control circuit 67 makes an attempt to detect the recording-haltable position on the writable disc 109 prescribed by the CD recording format by using the subcode synchronization signal 62 obtained from the subcode processing circuit 105. As the recording-haltable position is detected, the clock control circuit 67 resumes the generation of the RAM address generation clock signal 64 output to the RAM control circuit 103. The above processing is shown in FIG. 11 as step 306. As such, the generation of the RAM address generation clock signal 64 by the clock control circuit 67 is resumed. As a result, since the RAM control circuit 103 restarts the control of the RAM unit 102, operations to write and read digital data into and from the RAM unit 102 are resumed. Accordingly, the addition of the C1 and C2 codes by the error correction circuit 104, the interleave processing on the RAM unit 102 and the recording of data into the writable disc 109 by the laser diode 108 are also resumed. At this time, the processing returns to step 301 of FIG. 11.

In this manner, when the recording of the digital data indicated by reference letter (B) in FIG. 13 into the writable disc 109 is resumed after the recording of the digital data denoted by reference letter (A) has been temporarily halted, the data (B) can be linked to the data (A) in the RAM unit 102. This is because the data (A) is retained in the RAM unit 102 while the recording is being suspended so that as the recording is resumed the data (B) is stored sequentially into the RAM unit 102. In addition, after both the data (A) and (B) have been linked, the interleave processing is carried out so that the data recording into the writable disc 109 can be performed without resulting in an interleave discrepancy at the joint between both the data (A) and (B) which is also known as the edit point. Accordingly, playing of a writable disc into which data was stored using the joined recording method described above on an ordinary CD player currently in wide use does not generate an abnormal sound at an edit point due to an interleave discrepancy.

The descriptions given so far explain the recording operations of the embodiment of FIG. 11 and the reproducing operations of the embodiment are described below.

Since the reproducing operations do not have any differences from those of an ordinary CD player currently in general use, such operations are easily explained. The digital data that was recorded on the writable disc 109 by the laser diode 108 is reproduced and supplied to an EFM demodulation circuit 116 through the preamplifier 107 and a data strobe 112. The data is demodulated by the EFM demodulation circuit 116 and stored into the RAM unit 102 under the control of the RAM control circuit 103. The digital data stored in the RAM unit 102 is read under the control of the RAM control circuit 103 and input to the error correction circuit 104 in which C1 correction is carried out. The digital data is written back into the RAM unit 102 under the control of the RAM control circuit 103. Afterwards, the interleaving of the digital data stored in the RAM unit 102 is resolved under the control of the RAM control circuit 103 and then read and supplied to the error correction circuit 104 in which C2 correction is performed. The digital data is subsequently written again into the RAM unit 102 under the control of the RAM control circuit 103. Later, the digital data stored in the RAM unit 102 is read under the control of the RAM control circuit 103 and input to an interpolation processing circuit 117 in which interpolation processing is carried out. After undergoing the interpolation processing, the data is output. It should be noted that if an analog output signal is desired, the output of the interpolation processing circuit 117 is converted into an analog signal by means of a D/A converter 118. A synchronization signal detection and protection circuit 113 is coupled to the data signal 112 and provides frame synchronization signal 61 to the clock control circuit 67 as well as a signal to a timing generation circuit 114 coupled to a crystal oscillator 115.

Recording operations of the embodiment different from those explained so far are described next. The operations involve a case in which digital data stored in the RAM unit 102 cannot be retained due to, for example, a power-down occurring in the digital signal recording and reproducing apparatus during recording. Since operations up to the time recording is halted are the same as those described previously, only subsequent ones are explained. FIG. 15 is an illustrative diagram describing other recording operations of the digital signal recording and reproducing apparatus shown in FIG. 12. For the sake of convenience, digital data is represented by symbols arranged regularly on the RAM map in the manner shown in FIG. 13.

In order to replace digital data that cannot be retained in the RAM unit 102 while recording is being suspended, '0' data is generated by means of the A/D converter 101 by making its analog signal input mute at the time the recording is resumed. As shown in FIG. 15, '0' data is stored in as much a range of the RAM unit 102 as possible so long as no erroneous correction occurs. Subsequently, data that should be recorded, that is, the data (B), is stored in the RAM unit 102. Operations thereafter are the same as the ones described earlier.

In this manner, even in case data stored in the RAM unit 102 cannot be retained during a period of time the recording is being suspended, insertion of '0' data replacing data that should otherwise be retained allows data to be recorded into a writable disc 109 without resulting in an interleave discrepancy at an edit point. Accordingly, a writable disc into which data was recorded using the technique described above can be played on an ordinary CD player currently in general use without generating abnormal sounds at edit points due to interleave discrepancies.

Figure 16:
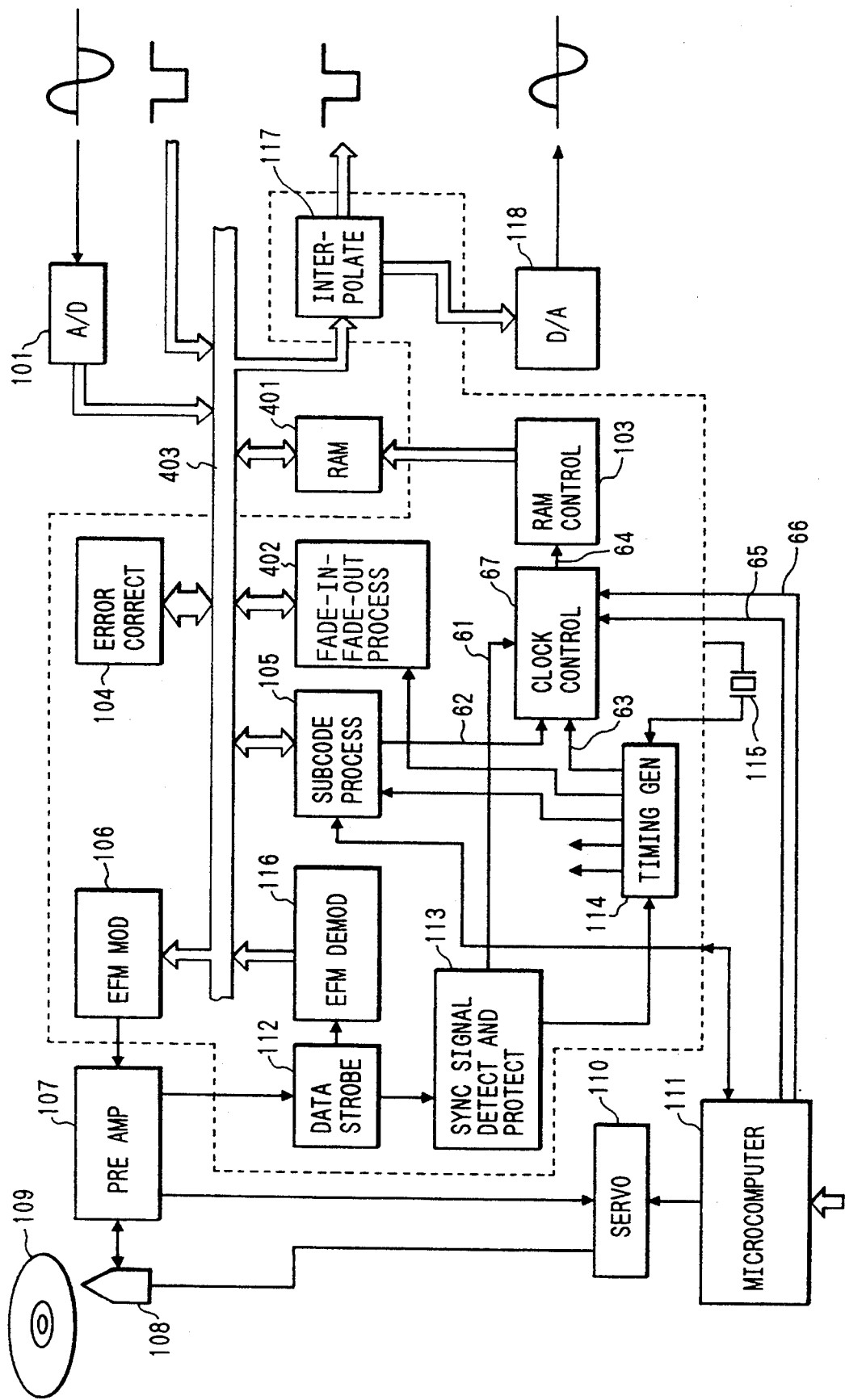
FIG. 16 is a block diagram of a further embodiment of the digital signal recording and reproducing apparatus according to the present invention.

FIG. 16 is a block diagram showing another embodiment of the digital signal recording and reproducing apparatus according to the invention, wherein a RAM unit 401 has a greater capacity than the RAM unit 102 shown in FIG. 12. There is also provided a feed-in-feed-out processing circuit 402 and a data bus 403. In this embodiment, feed-in-feed-out processing is performed on data in the proximity of an edit point when carrying out joined recording of digital data.

Figure 17:
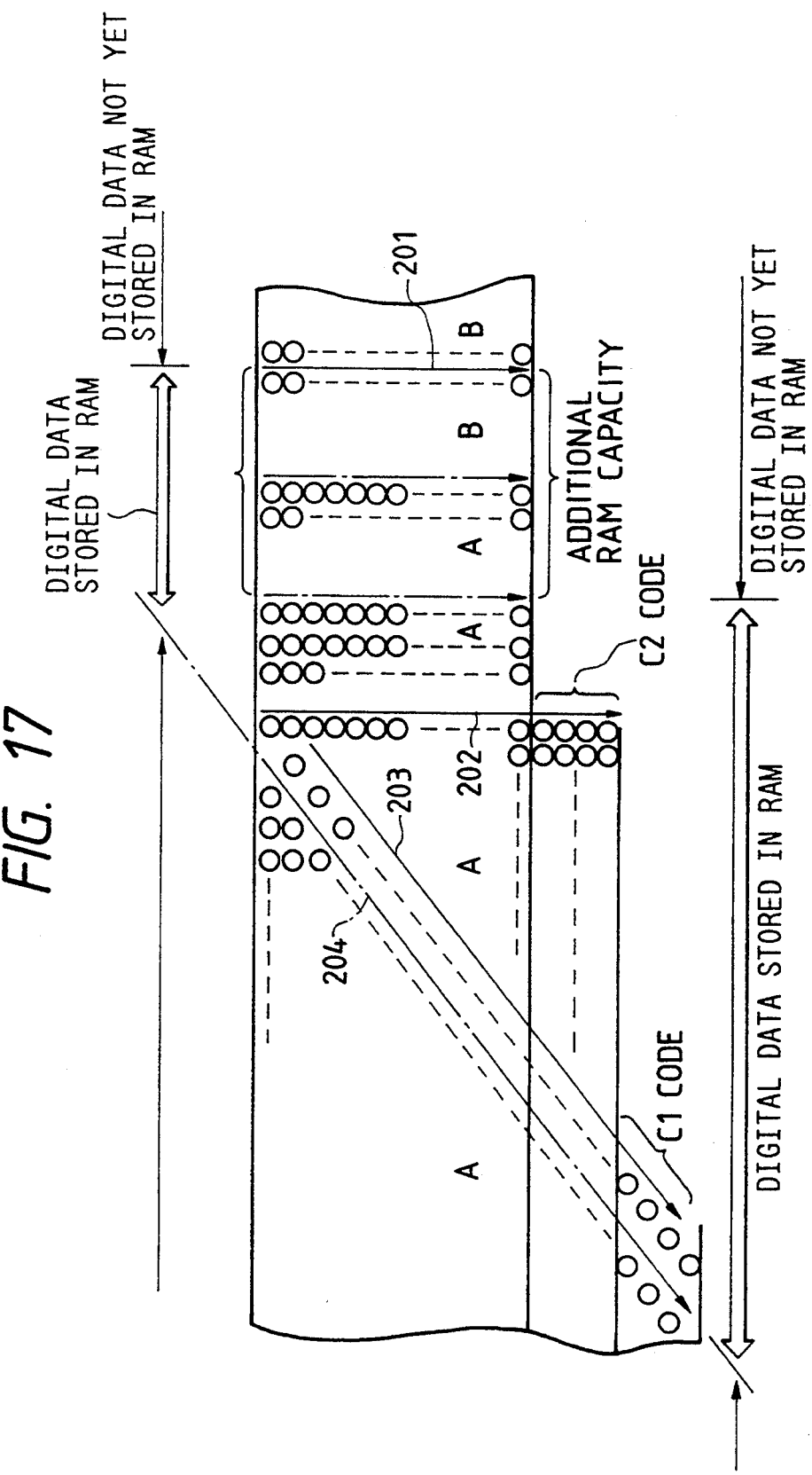
FIG. 17 is an illustrative diagram explaining a recording operation of the digital signal recording and reproducing apparatus shown in FIG. 16.

FIG. 17 is an illustrative diagram describing the principle of operation of the digital signal recording and reproducing apparatus shown in FIG. 16.

In order to explain a series of processings consisting of an operation to store digital data into the RAM unit 402, an operation to read it back and an operation to record the data into the writable disc 109, digital data is, for convenience, represented by symbolic units arranged regularly on the RAM map in FIG. 17 in a manner similar to the illustration in FIGS. 13 and 15.

First of all, recording operations of this embodiment are explained- Like the previous embodiment, input digital data is written into the RAM unit 401 under control of a RAM control circuit 103 as shown in FIG. 17. If the original input data is an analog signal, it is converted into digital data by means of an A/D converter 101 before being stored into the RAM unit 401. In this case, the digital data is stored into the RAM unit 401 as a block comprising a total of twenty four symbols as shown by the arrow 201 in FIG. 17. In order for the feed-in-feed-out processing circuit 402 to perform feed-in-feed-out processing normally, it is necessary to store excessive data for the feed-in-feed-out processing in the RAM unit 401. Therefore, the capacity of the RAM unit 401 is made greater than the RAM unit 102 of FIG. 12. Next, the digital data stored in the RAM unit 401 is read under the control of the RAM control circuit 103 and furnished to the feed-in-feed-out processing circuit 402 through the data bus 403.

Figure 18:
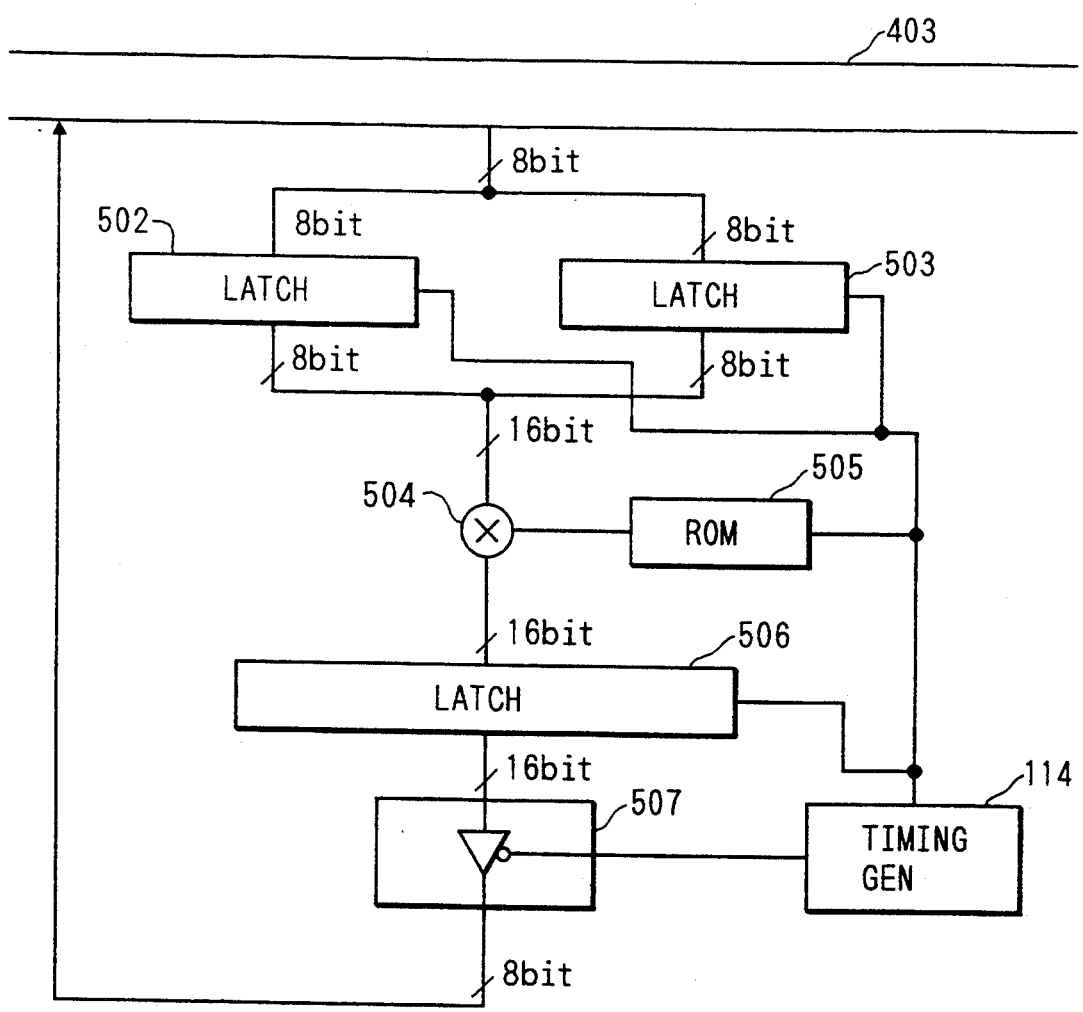
FIG. 18 is a block diagram of an actual implementation of a feed-in-feed-out processing circuit shown in FIG. 16.

FIG. 18 is a block diagram showing an actual example of the feed-in-feed-out processing circuit 402 shown in FIG. 16. There is provided eight-bit latches 502 and 503, a multiplier 504, a read only memory unit 505 which is referred to hereafter as a ROM unit, a sixteen-bit latch 506 and a gate circuit 507.

Figure 19:
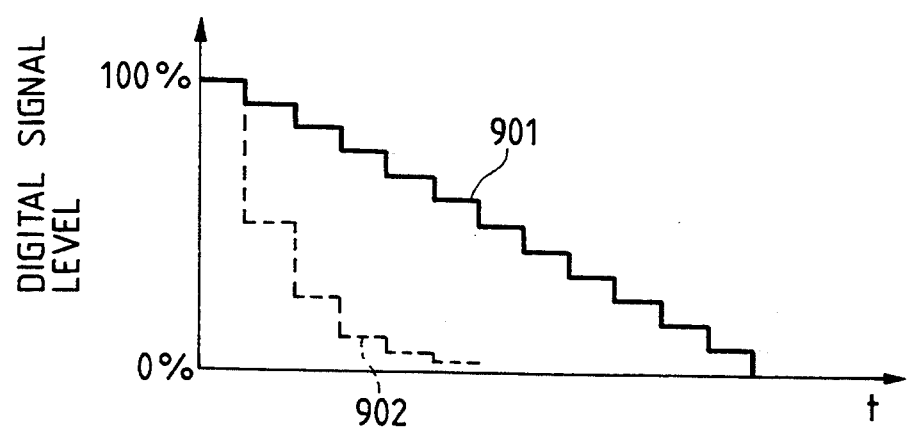
FIG. 19 is an illustrative diagram explaining feed-in-feed-out processing of the feed-in-feed-out processing circuit shown in FIG. 16.

FIG. 19 is an illustrative diagram depicting the feed-in-feed-out processing of the feed-in-feed-out processing circuit 402 shown in FIG. 16. A vertical axis and a horizontal axis shown in FIG. 19 represent digital signal levels and time respectively. A solid line 901 shown in the figure represents changes with time in digital signal level during a feed-out part of the feed-in-feed-out processing carried out by the feed-in-feed-out processing circuit 402 shown in FIG. 16. A broken line 902 is used to indicate changes with time in digital signal level during an ordinary attenuator process.

The digital data input to the feed-in-feed-out processing circuit 402 which is represented by a total of 24 symbolic units is split timewise into eight-bit pieces of data. The eight-bit pieces of data are then stored alternately into the eight-bit latches 502 and 503 as shown in FIG. 18. The eight-bit data latched in the latches 502 and 503 are combined into sixteen-bit data and input to the multiplier 504 in which the data is multiplied by a constant read from the ROM unit 505 to yield a product. The resulting product is supplied to the gate circuit 507 through the sixteen-bit latch 506. The gate circuit 507 converts the sixteen-bit data into eight bits which are output as output data of the feed-in-feed-out processing circuit 402. The output data of the feed-in-feed-out processing circuit 402 is stored back into the RAM 401 through the data bus 403 under the control of the RAM control circuit 103. The digital data stored in the RAM unit 401 is read back under the control of the RAM control circuit 103 and then provided to an error correction circuit 104. Subsequent operations are the same as those of the previously described embodiment.

If an external command to halt the recording is entered to a system control microcomputer 111 during data recording, the system control microcomputer 111 outputs a feed-out start signal (not shown) to the feed-in-feed-out processing circuit 402. As the feed-in-feed-out processing circuit 402 receives the feed-out start signal from the system control microcomputer 111, the constant values read from the ROM unit 505 shown in FIG. 18 decrease with the passage of time gradually, causing the gate circuit 507 to output digital signal levels attenuating with time as indicated by the solid line 901 in FIG. 19. Unlike the amount of attenuation of the attenuator processing indicated by the broken line 902, the amount of attenuation in this case varies linearly. As a result, no abnormality is felt by the auditory sense. As such, feed-out processing is carried out on the digital data by the feed-in-feed-out processing circuit 402.

Afterwards, when an external command to resume the recording is entered to the system control microcomputer 111, the system control microcomputer 111 outputs a recording resume signal 66 to the clock control circuit 67. At the same time, the system control microcomputer 111 outputs a feed-in start signal (not shown) to the feed-in-feed-out processing circuit 402. As the clock control circuit 67 receives the recording resume signal 66 from the system control microcomputer 111, the clock control circuit 67 makes an attempt to detect a recording-haltable position on the writable disc 109, at which the recording was halted earlier, by using a subcode synchronization signal 62 obtained from a subcode processing circuit 105. As the recording-haltable position is detected, the clock control circuit 67 resumes the generation of a RAM address generation clock 64 output to the RAM control circuit 103. On the other hand, as the feed-in-feed-out processing circuit 402 receives the recording resume signal 66 from the system control microcomputer 111, the constant values read from the ROM unit 505 shown in FIG. 18 this time gradually increase with the passage of time, causing the gate circuit 507 to output digital signal levels rising with time. In this manner, feed-in processing is carried out on the digital data by the feed-in-feed-out processing circuit 402.

As is described above, the embodiment performs the feed-in-feed-out processing on data in the proximity of an edit point when carrying out joined recording on digital data. Accordingly, playing back the writable disc does not generate an abnormal sound at an edit point due to an interleave discrepancy. In addition, reproduced sound free of inharmoniousness can be obtained.

Figure 20:
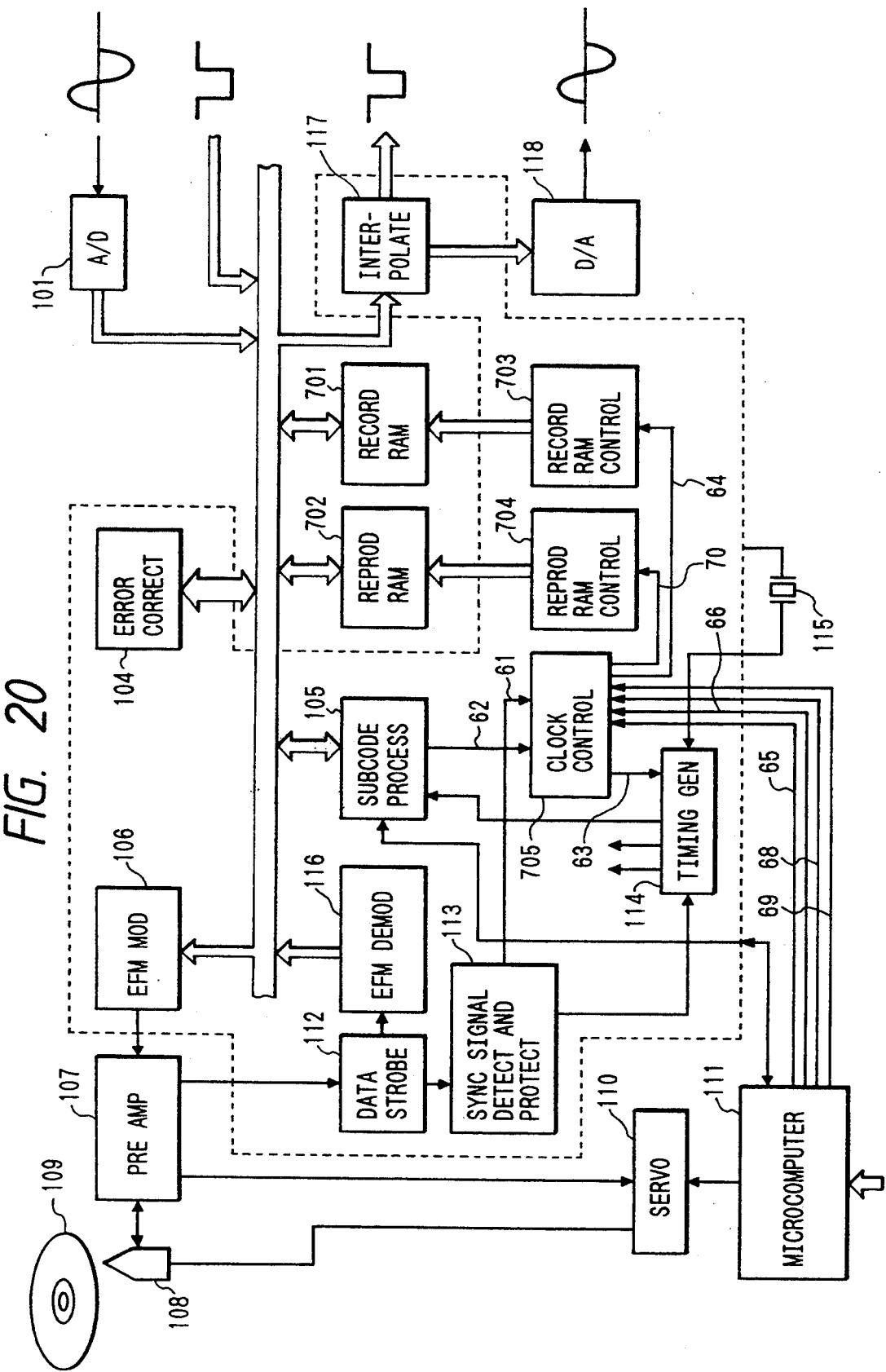
FIG. 20 is a block diagram of another embodiment of the digital signal recording and reproducing apparatus according to the present invention.

FIG. 20 is a block diagram illustrating a further embodiment of the digital signal recording and reproducing apparatus according to the present invention, wherein there is provided a reproduction halt signal 68, a reproduction start signal 69, a RAM address generation clock signal 70, a recording RAM unit 701, a reproducing RAM unit 702, a recording RAM control circuit 703, a reproducing RAM control circuit 704 and a clock control circuit 705. In this embodiment, joined recording is carried out as follows. When recording of digital data into a writable disc 109 is halted temporarily, digital data recorded up to the time the recording is halted is reproduced in order to check the recording state. After the recording state has been verified, the recording is resumed.

The recording operations of the embodiment of FIG. 20 are now described. First of all, input digital data is written into the recording RAM unit 701 under control of the recording RAM control circuit 703. If the original input data is an analog signal, it is converted into digital data by means of an A/D converter 101 before being stored into the recording RAM unit 701. In controlling the recording operation on the recording RAM unit 701, the recording RAM control circuit 703 generates addresses by using the RAM address generation clock signal 64 received from the clock control circuit 705. Next, the digital data stored in the recording RAM unit 701 is read under the control of the recording RAM control circuit 703. Subsequent operations are the same as the embodiment of FIG. 12.

Afterwards, if an external command to halt the recording is entered to a system control microcomputer 111 during data recording, the system control microcomputer 111 outputs a recording halt signal 65 to the clock control circuit 705. When the clock control circuit 705 receives the recording halt signal 65 from the system control microcomputer 111, the clock control circuit 705 makes an attempt to detect a recording-haltable position on the writable disc 109 by using a subcode synchronization signal 62 coming from a subcode processing circuit 105. As the recording-haltable position is detected, the generation of the RAM address generation clock signal 64 which is output to the recording RAM control circuit 703 is discontinued.

In this manner, the generation of the RAM address generation clock signal 64 is halted. As a result, since the recording RAM control circuit 703 stops controlling the recording RAM unit 701, operations to write and read digital data into and from the recording RAM unit 701 are no longer carried out. Accordingly, digital data stored in the recording RAM unit 701, but not recorded yet into the writable disc 109 is retained in the recording RAM unit 701 as it is and, at the same time, the addition of C1 and C2 codes by an error correction circuit 104, interleaving processing on the recording RAM unit 701 and the recording of digital data into the writable disc 109 by means of a laser diode 108 are also halted.

A recording state is verified as follows. When an external command to start reproduction is entered to the system control microcomputer ill, the system control microcomputer 111 outputs a reproduction start signal 69 to the clock control circuit 705. When the clock control circuit 705 receives the reproduction start signal 69 from the system control microcomputer 111, the clock control circuit 705 starts generation of the RAM address generation clock signal 70 which is output to the reproduction RAM control circuit 704. Receiving the RAM address generation clock signal 70 from the clock control circuit 705, the reproduction RAM control circuit 704 generates addresses, controlling the reproduction RAM unit 702. Reproduction is thus started.

In this manner, the reproduction is carried out in order to verify the recording state of the digital data recorded previously. As an external command to halt the reproduction is entered to the system control microcomputer 111, the system control microcomputer 111 outputs a reproduction halt signal 68 to the clock control circuit 705. When the clock control circuit 705 receives the reproduction halt signal 68 from the system control microcomputer 111, the clock control circuit 705 stops the generation of the RAM address generation clock signal 70 which is output to the reproduction RAM control circuit 704. Receiving no RAM address generation clock signal 70 from the clock control circuit 705, the reproduction RAM control circuit 704 discontinues the controlling of the reproduction RAM unit 702. Reproduction is thus halted.

Later on, the recording is resumed as follows. When an external command to resume the recording is entered to the system control microcomputer ill, the system control microcomputer 111 outputs a recording resume signal 66 to the clock control circuit 705. When the clock control circuit 705 receives the recording resume signal 66 from the system control microcomputer ill, the clock control circuit 705 makes an attempt to detect the recording-haltable position on the writable disc 109, at which the recording was halted previously, by using the subcode synchronization signal 62 coming from the subcode processing circuit 105. As the recording-haltable position is detected, the generation of the RAM address generation clock signal 64 which is output to the recording RAM control circuit 703 is resumed. In this way, the generation of the RAM address generation clock signal 64 is resumed. As a result, the recording RAM control circuit 703 resumes the control of the recording RAM unit 701, restarting the recording operation.

As is described above, in this embodiment, joined recording of digital data is implemented by reproducing digital data recorded on the writable disc 109 up to the time the recording is halted temporarily in order to verify the recording state. While the recording operation is being suspended, incoming data is retained in the recording RAM unit 701. Now that the incoming data has been retained in the recording RAM unit 701, subsequent incoming data is stored in the recording RAM unit 701 following the data retained previously whenever the recording is restarted. Accordingly, the later incoming data can be linked to the earlier incoming data.

In each of the embodiments of FIGS. 12, 16 and 20, the broken line block encompassing the plurality of parts represents a portion of the digital recording and reproducing apparatus which has such parts integrated into a single LSI chip.

As a result, digital data can be recorded into the writable disc 109 without generating an interleave discrepancy at an edit point much like the embodiment of FIG. 12. Therefore, playing back the writable disc 109 on an ordinary CD player does not produce abnormal sounds at edit points caused by interleave discrepancies.

As is described above, joined recording of digital data into a writable disc according to the invention is implemented by retaining incoming data in a RAM unit while the recording operation is being suspended after the recording is halted temporarily. When the recording is restatted, subsequent incoming data is stored in the RAM unit following the data retained previously. In this manner, the later incoming data can be linked to the earlier incoming data. In addition, since interleave processing is performed on the linked data, the data can be recorded into the writable disc without generating an interleave discrepancy at an edit point, i.e., the joint between the earlier and later incoming data. Therefore, playing back the writable disc into which digital data was recorded using the joined recording method described above on an ordinary CD player currently in general use does not produce abnormal sounds at edit points caused by interleave discrepancies. As a result, inharmoniousness in the auditory sense due to generation of abnormal sounds can be reduced.

When recording of digital data into the disc is temporarily halted, the digital signal recording and reproducing apparatus continuously checks whether or not the recording means is on a recording-haltable position of the disc and as the recording means is detected to be on the recording-haltable position of the disc, the digital signal recording and reproducing apparatus discontinues the control by the RAM controller and the recording by the recording means. Accordingly, digital data stored in the RAM unit but not recorded yet into disc is retained in the RAM unit as it is.

Later, when the recording of the digital signal is resumed, the digital signal recording and reproducing apparatus continuously checks whether or not the recording unit is on the recording-haltable position of the disc and as the recording unit is detected to be on the recording-haltable position of the disc, the digital signal recording and reproducing apparatus resumes the control by the RAM controller and the recording by the recording unit. Accordingly, new digital data is written into the RAM unit sequentially and the new digital data can be chained or joined to the existing data retained in the RAM unit. In addition, after both the digital data have been linked, new data can be recorded into the disc with no interleave discrepancy occurring at the joint between the data or the edit point because the interleaving described previously has been applied to the digital data existing in the RAM unit.

Accordingly, when a disc on which digital data is stored using the joined recording method described above is played back on an ordinary CD player which is in wide and general use at the present time, no abnormal sound is generated at an edit point due to an interleave discrepancy.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. A digital signal recording method for recording first digital data and second digital data on a writable disc without an interleave discrepancy therebetween wherein the first digital data is previously recorded and the second digital data is at least one of overlapped and joined with the first digital data on the writable disc, comprising the steps of:

performing interleave processing on the second digital data by rearranging the order of words in every block comprising N words of the second digital data by delaying the words by delay times different form each other, N being a positive integer;

recording the second digital data onto the writable disc over the first digital data having completed interleave processing and being previously stored on the writable disc so that no interleave discrepancy occurs between the first and second recorded digital data on the writable disc;

setting an edit point at which overlap recording of the second digital data onto the writable disc is to be started;

selecting a block having words stored on both sides of the edit point among blocks of the first digital data stored on the writable disc;

reproducing a portion of the first digital data including all words of the selected block;

performing deinterleave processing on the reproduced portion of the first digital data by restoring words in every block of the reproduced portion to an original order of the words by delaying the words by delay times different from each other and storing the restored words of the selected block of the reproduced portion in a memory unit;

reading back the restored words of the first digital data from the memory unit and appending the second digital data to the restored words of the first digital data read from the memory unit;

performing the interleave processing on the restored words of the first digital data together with the appended second digital data; and recording words of the first digital data long with the appended second digital data onto the writable disc so that the words of the first digital data are recorded into locations on the writable disc in the same position of the first digital data prior to reproduction of the first digital data so that the first and second data are joined at the edit point without an interleave discrepancy.

2. A digital signal recording method for recording first digital data and second digital data on a writable disc without an interleave discrepancy therebetween wherein the first digital data is previously recorded and the second digital data is at least one of overlapped and joined with the first digital data on the writable disc, comprising the steps of:

performing interleave processing on the second digital data by rearranging the order of words in every block comprising N words of the second digital data by delaying the words by delay times different from each other, N being a positive integer;

recording the second digital data onto the writable disc over the first digital data having completed interleave processing and being previously stored on the writable disc so that no interleave discrepancy occurs between the first and second recorded digital data on the writable disc;

setting an edit point at which the overlapped recording of the second digital data over the first digital data is to be ended;

ending the interleaved processing and the overlapped recording of the second digital data when the overlap recording of the second digital data onto the writable disc reaches the edit point and retaining a portion of the second digital data with the interleave processing pending;

reproducing the first digital data recorded after the edit point on the writable disc;

performing deinterleave processing on the reproduced portion of the first digital data by restoring words in every block of the reproduced portion to an original order of the words by delaying the words by delay times different from each other;

selecting blocks from the reproduced first digital data having words which have completed the deinterleave processing;

storing the words of the selected blocks into a memory unit for a period of time longer than a largest value among delay times utilized in delaying the words;

resuming the interleaved processing and t the same time reading back the words of he first digital data from the memory unit;

appending the words of the first digital data read from the memory unit to the second digital data retained previously with the interleaved processing pending;

performing the interleave processing on the retained second digital data together with the appended words of the first digital data; and recording the second digital data together with the appended words of the first digital data onto the writable disc so that the words of the first digital data are recorded into locations on the writable disc in the same position at which the words of the first digital data were previously recorded so that the first and second digital data are joined at the edit point without an interleave discrepancy.

3. A digital signal recording method for recording first digital data and second digital data on a writable disc without an interleave discrepancy therebetween wherein the first digital data is previously recorded and the second digital data is at least one of overlapped and joined with the first digital data on the writable disc, comprising the steps of:

performing interleave processing on the second digital data by rearranging the order of words in every block comprising N words of the second digital data by delaying the words by delay times different from each other, N being a positive integer;

recording the second digital data onto the writable disc over the first digital data having completed interleave processing and being previously stored on the writable disc so that no interleave discrepancy occurs between the first and second recorded digital data on the writable disc;

setting an edit point at which overlap recording onto the writable disc is to be ended;

recording fixed data onto the writable disc in place of the second digital data for a period of time longer than a largest value among delay times utilized in delaying words of the second digital data and performing the interleaving processing for the overlap recording of the second digital data onto the writable disc and terminating the recording of the fixed data when the recording of the fixed data reaches the edit point;

reproducing the first digital data recorded after the edit point on the writable disc;

performing the interleave processing on the reproduced portion of the first digital data by restoring words in every block of the reproduced portion to an original order of the words by delaying the words by delay time different from each other;

selecting blocks from among the reproduced first digital data having words which have completed the deinterleave processing;

storing the words of the selected blocks into a memory unit for a period of time longer than a largest value among delay time used in delaying the words;

reading back the words of the first digital data from the memory unit and appending the words of the first digital data read form the memory unit to the fixed data;

performing the deinterleave processing on the fixed data together with the appended words of the first digital data; and recording the fixed data together with the appended words of the first digital data onto the writable disc so that the words of the first digital data are recorded into locations on the writable disc at the same position at which the words of the first digital data were previously recorded so that digital data re joined at the edit point without an interleave discrepancy.

4. A digital signal recording method for recording digital data at different timing on a writable disc without an interleave discrepancy therebetween utilizing a digital signal recording and reproducing apparatus having a RAM unit for storing digital data, RAM control means for controlling the RAM unit, correction means for adding first and second correction codes to the digital data, modulation means for modulating the digital data, means for inputting digital data, means for recording the digital data onto the writable disc, means for reading the digital data after writing the input digital data into the RAM unit under control of the RAM control means, first read correction means for adding the first correction code to the read digital data, means for writing the digital data containing the first correction code into the RAM unit under control of the RAM control means, means for reading the digital data after applying interleaving based on a predetermined delay technique to the written data under control of the RAM control means, second read correction means for adding the second correction code to the read digital data, means for reading the digital data after writing the digital data containing the second correction code into the RAM unit under control of the RAM control means, means for modulating the read digital data, and the recording means recording the digital data into the writable disc, the method comprising the steps of:

continuously checking whether the recording means is on a recording-haltable position of the writable disc wherein the recording of digital data onto the writable disc is temporarily halted based upon index information thereon; and operating the RAM control means so that the digital data to be recorded onto the writable disc after the recording-haltable position is recorded on the writable disc and is properly joined with the digital data recorded prior to the recording-haltable position without an interleave discrepancy therebetween.

5. A digital signal recording method according to claim 4, further comprising the steps of upon detection of a recording-haltable position, discontinuing control by the RAM control means and the recording by the recording means are discontinued, continuously checking whether the recording means is on the recording-haltable position of the disc and upon determining that the recording means is on the recording-haltable position of the disc, resuming the recording of the digital signal including the control by the RAM control means and the recording by the recording means so that the digital data recorded prior to the recording-haltable positions and the digital data recorded after the recording-haltable position are joined on the writable disc without an interleave discrepancy.

6. A digital signal recording method according to claim 5, wherein the recording-haltable position is an edit point and the digital data recorded prior to the edit point and after the edit point are first digital data and second digital data, respectively.

7. A digital signal recording and reproducing apparatus for recording digital data at different timing on a writable disc without an interleave discrepancy therebetween, the digital signal recording and reproducing apparatus having a RAM unit for storing digital data, RAM control means for controlling the RAM unit, correction means for adding first and second correction codes to the digital data, modulation means for modulating the digital data, means for inputting digital data, means for recording the digital data onto the writable disc, means for reading the digital data after writing the input digital data into the RAM unit under control of the RAM control means, first read correction means for adding the first correction code to the read digital data, means for writing the digital data containing the first correction code into the RAM unit under control of the RAM control means, means for writing the digital data after applying interleaving based on a predetermined delay technique to the written data under control of the RAM control means, means for adding the second correction code to the read digital data using the correction means, means for reading the digital data after writing the digital data containing the second correction code into the RAM unit under control of the RAM control means, means for modulating the read digital data, and the recording means recording the digital data into the writable disc, detecting means for continuously checking whether the recording means is on a recording-haltable position of the writable disc wherein the recording of digital data onto the writable disc is temporarily halted based upon index information thereon, and means for operating the RAM control means so that the digital data to be recorded onto the writable disc after the recording-haltable position is recorded on the writable disc and is properly joined with the digital data recorded prior to the recording-haltable position without an interleave discrepancy therebetween.

8. A digital signal recording and reproducing apparatus according to claim 7, wherein the operating means discontinues operation of the RAM control means and the recording means in response to the detecting means detecting a recording-haltable position of the recording means on the writable disc, the detecting means continuously checking whether the recording means is on the recording-haltable position of the writable disc, and the operating means being responsive to the detecting means is on the recording-haltable position for resuming control by the RAM control means and the recording by the recording means so that digital data recorded prior to the recording-haltable position and the digital data recorded after the recording-haltable position are joined on the writable disc without an interleave discrepancy.

9. A digital signal recording method for recording first digital data and second digital data on a writable disc without an interleave discrepancy therebetween, wherein each of the first digital data and second digital data includes a plurality blocks each having rearrangeable N words, N being a positive integer, and the first digital data is interleaved by rearranging an order of the rods in every block by delaying the words by delay times different form each other and is previously recorded, and the second digital data is to be interleaved and recorded onto the writable disc in at least one of overlapped and joined relation with the first digital data on the writable disc, the method comprising the steps of:

reproducing the first digital data;

performing a deinterleave processing on the reproduced first digital data by arranging the words into an original order by delaying the words by delay times different from each other;

performing interleave processing on said deinterleave processed first digital data and said second digital data by rearranging the words by delaying the words by delay times different from each other;

recording the interleave processed second digital data onto the writable disc over the interleave processed first digital data on the writable disc so that no interleave discrepancy occurs between said first and second recorded digital data on the writable disc.

10. A digital signal recording method for recording first digital data and second digital data on a writable disc without an interleave discrepancy therebetween, wherein each of the first digital data and second digital data includes a plurality blocks each having rearrangeable N words, N being a positive integer, and the first digital data is interleaved by rearranging an order of the rods in every block by delaying the words by delay times different form each other and is previously recorded, and the second digital data is to be interleaved and recorded onto the writable disc in at least one of overlapped and joined relation with the first digital data on the writable disc, the method comprising the steps of:

setting an edit point at which overlap recording of the second digital data onto the writable disc is to be started;

selecting a block having words stored on both sides of the edit point among blocks of the first digital data stored on the writable disc;

reproducing a portion of the first digital data including all words of the selected block;

performing deinterleave processing on the reproduced portion of the first digital data by arranging words in every block of the reproduce portion in an original order of the words, and restoring the deinterleave processed word of the selected block of the reproduced portion in a memory unit;

reading back the restored words of the first digital data from the memory unit and appending the second digital data to the restored words of the first digital data read from the memory unit;

performing interleave processing on the restored words of the first digital data together with the appended second digital data by rearranging the words by delaying the words by delay times different form each other; and recording words of the first digital data along with the appended second digital data onto the writable disc so that the words of the first digital data are recorded into locations on the writable disc in the same position of the first digital data prior to reproduction of the first digital data so that the first and second data are joined at the edit point without an interleave discrepancy.

11. A digital signal recording method for recording first digital data and second digital data on a writable disc, wherein each of the first digital data nd the second digital data includes a plurality blocks each having rearrangeable N words, N being a positive integer, and the first digital data is interleaved by rearranging an order of the words in every block by delaying the words by delay times different from each other and is previously recorded on the writable disc, and the second digital data is to be interleaved and recorded onto the writable disc in at least one of overlapped and joined relation with the first digital data, the method comprising the steps of:

setting an edit point at which the overlapped recording of the second digital data over the first digital data is to be ended;

ending the interleaved processing and the overlapped recording of the second digital data when the overlap recording of the second digital data onto the writable disc reaches the edit point and retaining a portion of the second digital data with the interleave processing pending;

reproducing the first digital data recorded after the edit point on the writable disc;

performing deinterleave processing on the reproduced portion of the first digital data by arranging words in every block of the reproduced portion to an original order of the words by delaying the words by delay times different from each other;

selecting blocks from the reproduced first digital data having words which have completed the deinterleave processing;

storing the words of the selected blocks into a memory unit for a period of time longer than a largest value among delay times utilized in delaying the words;

resuming the interleaved processing and at the same time reading back the words of the first digital data from the memory unit;

appending the words of the first digital data read from the memory unit to the second digital data retained previously with the interleaved processing pending;

performing the interleave processing on the retained second digital data together with the appended words of the first digital data; and recording the second digital data together with the appended words of the first digital data onto the writable disc so that the words of the first digital data are recorded into locations on the writable disc in the same position at which the words of the first digital data were previously recorded so that the first and second digital data are joined at the edit point without an interleave discrepancy.

12. A digital signal recording method for recording first digital data and second digital data on a writable disc, wherein each of the first digital data and the second digital data includes a plurality blocks each having rearrangeable N words, N being a positive integer, and the first digital data is interleaved by rearranging an order of the words and is previously recorded on the writable disc, and the second digital data is to be interleaved and recorded onto the writable disc in overlapped or joined relation with the first digital data, the method comprising the steps of:

setting an edit point at which overlap recording onto the writable disc is to be ended;

recording fixed data onto the writable disc in place of the second digital data for a period of time longer than a largest value among delay times utilized in delaying words of the second digital data and performing the interleaving processing for the overlap recording of the second digital data onto the writable disc and terminating the recording of the fixed data when the recording of the fixed data reaches the edit point;

reproducing the first digital data recorded after the edit point on the writable disc;

performing the interleave processing on the reproduced portion of the first digital data by restoring words in every block of the reproduced portion to an original order of the words by delaying the words by delay times different from each other;

selecting blocks from among the reproduced first digital data having words which have completed the deinterleave processing;

storing the words of the selected blocks into a memory unit for a period of time longer than a largest value among delay times used in delaying the words;

reading back the words of the first digital data form the memory unit and appending the words of the first digital data read from the memory unit to the fixed data;

performing the deinterleave processing on the fixed data together with the appended words of the first digital data; and recording the fixed data together with the appended words of the first digital data onto the writable disc so that the words of the first digital data re recorded into locations on the writable disc at the same position at which the words of the first digital data were previously recorded so that digital data re joined at the edit point without an interleave discrepancy therebetween.

13. A digital signal joined recording method for recording digital data at different timing on a writable disc, wherein the recording of digital data onto the writable disc is temporarily halted and when the recording is resumed, without an interleave discrepancy between the digital data recorded before the recording is halted and the digital data recorded after the recording is resumed, utilizing a digital signal recording and reproducing apparatus having a RAM unit for storing digital data, RAM control means for controlling the RAM unit, correction means for adding first and second correction codes to the digital data, modulation means for modulating the digital data, means for inputting digital data, means for recording the digital data onto the writably disc, said RAM control means read the digital data after writing the input digital data into the RAM unit, said correction means add the first correction code to the read digital data, said RAM control means write the digital data containing the first correction code into the RAM unit, said RAM control means read the digital data applying interleaving based on a predetermined delay technique to the written data , said correction means add the second correction code to the read digital data, said RAM control means read the digital data after writing the digital data containing the second correction code into the RAM unit, said modulation means modulate the read digital data, and for recording the digital data into the writable disc, the method comprising the steps of:

checking whether the recording means is on a recording-haltable position of the writable disc based on index information thereon at the time of receiving in external command for halting or resuming the recording of the digital signal;

operating the RAM control and the recording means after detecting that the recording means is on the recording-haltable position of the writable disc so that the digital data to be recorded onto the writable disc after the recording-haltable position is recorded on the writable disc and is properly joined with the digital data recorded prior to the recording-haltable position without an interleave discrepancy therebetween.

14. A digital signal joined recording method for recording digital data at different timing on a writable disc, wherein the recording of digital data onto the writable disc is temporarily halted and when the recording is resumed, without an interleave discrepancy between the digital data recorded before the recording is halted and the digital data recorded after the recording is resumed, utilizing a digital signal recording and reproducing apparatus having a RAM unit for storing digital data, RAM control means for controlling the RAM unit, correction means for adding first and second correction codes to the digital data, modulation means for modulating the digital data, means for inputting digital data, means for recording the digital data onto the writably disc, said RAM control means read the digital data after writing the input digital data into the RAM unit, said correction means add the first correction code to the read digital data, said RAM control means write the digital data containing the first correction code into the RAM unit, said RAM control means read the digital data applying interleaving based on a predetermined delay technique to the written data , said correction means add the second correction code to the read digital data, said RAM control means read the digital data after writing the digital data containing the second correction code into the RAM unit, said modulation means modulate the read digital data, and said recording means record the digital data into the writable disc, the method comprising the steps of:

receiving an external command for halting the recording of digital data onto the writable disc, checking whether the recording means is on a recording-haltable position of the writable disc based on index thereon, discontinuing control by the RAM control means and the recording by the recording means after detecting that the recording means is on the recording-haltable position;

receiving an external command for resuming the recording of the digital signal, checking whether the recording means is on the recording-haltable position, resuming the control by the RAM control means an the recording of the digital signal by the recording means after detecting that the recording means is on the recording-haltable position.

15. A digital signal recording method according to claim 14, wherein the recording-haltable position is an edit point and the digital data recorded prior to the edit point and after the edit point are first digital data nd second digital data, respectively.

16. A digital signal recording and reproducing apparatus for recording first digital data and second digital data on a writable disc without an interleave discrepancy therebetween, wherein each of said first digital data and second digital data includes a plurality blocks each having rearrangeable N words, N being a positive integer, and said first digital data is interleaved by rearranging an order of said words in every block by delaying the words by delay times different from each other and is previously recorded, and said second digital data is to be interleaved and recorded onto said writable disc in at least one of overlapped and joined relation with said first digital data on the writable disc, said apparatus comprising;

means for reproducing said first digital data;
means for performing a deinterleave processing on said reproduced first digital data by arranging said words into an original order by delaying the words by delay times different from each other;
means for performing interleave processing on said deinterleave processed first digital data and said second digital data by rearranging said words by delaying the words by delay times different form each other; and
means for recording said interleave processed second digital data onto the writable disc over said interleave processed first digital data on the writable disc so that no interleave discrepancy occurs between the first and second recorded digital data on the writable disc.

17. A digital signal joined recording and reproducing apparatus for recording digital data at different timing on a writable disc, wherein the recording of digital data onto the writable disc is temporarily halted and then the recording is resume, without an interleave discrepancy between the digital data recorded before the recording is halted and the digital data recorded after the recording is resumed, the digital signal recording and reproducing apparatus having a RAM unit for storing digital data, RAM control means for controlling the RAM unit, correction means for adding first and second correction codes to the digital data, modulation means for modulating the digital data, means for inputting digital data, means for recording the digital data onto the writable disc, said RAM control means and the digital data after writing the input digital data into the RAM unit, said correction means add the first correction code to the read digital data, said RAM control means write the digital data containing the first correction code into the RAM unit, said RAM control means write the digital data applying interleaving based on a predetermined delay technique to the written data, said correction means add the second correction code to the read digital data, said modulation means modulate the read digital data, and said recording means record the digital data into the writable disc, said apparatus comprising:

means for checking whether the recording mean sis on a recording-haltable position of the writable disc based on index information thereon at the time of receiving an external command for halting or resuming the recording of the digital signal; and
means for operating the RAM control means and the recording means after detecting that the recording means is on the recording-haltable position of the writable disc so that the digital data to be recorded onto the writable disc after the recording-haltable position is recorded on the writable disc and is properly joined with the digital data recorded prior to the recording-haltable position without an interleave discrepancy therebetween.

18. A digital signal recording and reproducing apparatus according to claim 17, wherein the operating means discontinues operation of the RAM control means and the recording means in response to the checking means after that the external command for halting the recording of digital data onto the writable disc is received and after detecting that the recording means is on the recording-haltable position, and the operating means resumes operation of the RAM control means and the recording means in response to the checking means after that the external command for resuming the recording of digital data onto the writable disc is received and after detecting that the recording means is on the recording-haltable position so that digital data recorded prior to the recording-haltable position and the digital data recorded after the recording-haltable position are joined on the writable disc without an interleave discrepancy.

* * * * *